United States Patent
Broughton et al.

(10) Patent No.: US 11,746,733 B1
(45) Date of Patent: Sep. 5, 2023

(54) MARINE ENGINE ASSEMBLY HAVING A SEALING VALVE

(71) Applicant: BRP US INC., Sturtevant, WI (US)

(72) Inventors: George Broughton, Wadsworth, IL (US); Mark J. Skrzypchak, Pleasant Prairie, WI (US); Thomas Whitburn, Burlington, WI (US); Nathan Blank, Burlington, WI (US)

(73) Assignee: BRP US Inc.

( * ) Notice: Subject to any disclaimer, the term of this patent is extended or adjusted under 35 U.S.C. 154(b) by 286 days.

(21) Appl. No.: 17/164,256

(22) Filed: Feb. 1, 2021

Related U.S. Application Data

(60) Provisional application No. 62/968,846, filed on Jan. 31, 2020.

(51) Int. Cl.
| | |
|---|---|
| F02M 35/16 | (2006.01) |
| B63H 20/04 | (2006.01) |
| F02B 61/04 | (2006.01) |
| B63H 20/10 | (2006.01) |

(52) U.S. Cl.
CPC ........... F02M 35/168 (2013.01); B63H 20/04 (2013.01); F02B 61/045 (2013.01); B63H 20/10 (2013.01)

(58) Field of Classification Search
CPC ...... F02M 35/168; F02M 35/16; B63H 20/04; B63H 20/10; F02B 61/045
See application file for complete search history.

(56) References Cited

U.S. PATENT DOCUMENTS

| | | |
|---|---|---|
| 2,207,372 A | 7/1940 | Clarke |
| 2,216,496 A | 10/1940 | Mackay |
| 2,773,353 A * | 12/1956 | Oishel ............... F15B 11/06 49/70 |
| 3,164,122 A | 1/1965 | Morris |
| 3,452,704 A | 6/1969 | Cothron |
| 3,911,853 A | 10/1975 | Strang |
| 3,949,717 A * | 4/1976 | Rittmannsberger .... F02D 41/12 123/493 |
| 4,178,873 A | 12/1979 | Bankstahl |
| 4,559,018 A | 12/1985 | Harada et al. |
| 4,726,799 A | 2/1988 | Harada et al. |
| 4,773,215 A | 9/1988 | Litjens et al. |
| 5,344,350 A | 9/1994 | Hatch |
| 5,472,361 A | 12/1995 | Fujimoto et al. |
| 5,996,734 A | 12/1999 | Blanchard et al. |
| 7,510,451 B2 | 3/2009 | Inaba |
| 2019/0233073 A1 | 8/2019 | Wiatrowski |

FOREIGN PATENT DOCUMENTS

CN 2816388 Y * 9/2006

* cited by examiner

*Primary Examiner* — Stephen P Avila
(74) *Attorney, Agent, or Firm* — BCF LLP

(57) ABSTRACT

A marine engine assembly for mounting to a watercraft is disclosed. The marine engine assembly has an engine unit, an exhaust system fluidly and a propulsion device. The engine unit includes an engine unit housing, an internal combustion engine and an air intake assembly. The air intake assembly, at least one combustion chamber, and the exhaust system together defining at least in part a gas flow pathway. A sealing valve is provided in the gas flow pathway. The sealing valve has an open position permitting flow of gas therethrough. The sealing valve has a closed position preventing flow of gas therethrough for sealing a portion of the gas flow pathway downstream of the sealing valve from a portion of the gas flow pathway upstream of the sealing valve.

21 Claims, 22 Drawing Sheets

MARINE ENGINE ASSEMBLY HAVING A SEALING VALVE

CROSS-REFERENCE

The present application claims priority from U.S. Provisional Patent Application No. 62/968,846, filed Jan. 31, 2020, the entirety of which is incorporated herein by reference.

TECHNICAL FIELD

The present technology relates to marine engine assemblies and more specifically water intrusion prevention in internal combustion engines of marine engine assemblies.

BACKGROUND

A typical marine outboard engine assembly is formed from an engine unit with an internal combustion engine, a lower unit with a propeller, and a midsection connecting the engine to the propeller. The midsection also has an exhaust channel to bring exhaust from the engine to be expelled out through the lower unit.

The outboard engine assembly is generally connected to its corresponding watercraft by a transom or mounting bracket, typically connected to the midsection, below the engine unit. The bracket connects to a rear portion of the watercraft, such that the engine unit and part of the midsection is well above the water. In some cases, however, it could be preferable to have a marine engine which is disposed lower relative to the watercraft to allow more useable room in the watercraft for example.

However, by positioning the marine engine lower, a portion of the engine unit, and therefore the engine, will likely be below the water level at least some of the time, risking water intrusion in the engine. When the engine is operating, the flow of exhaust gases out of the marine engine is usually sufficient to prevent water intrusion into the engine via the exhaust system. However, when the engine is stopped, the flow of exhaust gases stops, and the risk of water entering the exhaust system, and potentially the engine under some circumstances, is greater.

Therefore, there is a desire for a marine engine assembly having features assisting in the prevention of water intrusion in the engine.

SUMMARY

It is an object of the present technology to ameliorate at least some of the inconveniences present in the prior art.

According to one aspect of the present technology, there is provided a marine engine assembly having a marine engine assembly for mounting to a watercraft. The marine engine assembly has an engine unit including: an engine unit housing; an internal combustion engine disposed in the engine unit housing, the engine defining at least one combustion chamber; and an air intake assembly disposed in the engine unit housing, the air intake assembly defining an air inlet, the air intake assembly being fluidly connected to the at least one combustion chamber for supplying air to the at least one combustion chamber, the air intake assembly including a throttle valve. The marine engine assembly also has an exhaust system fluidly communicating with the at least one combustion chamber for supplying exhaust gases from the at least one combustion chamber to an exterior of the marine engine assembly. The exhaust system defines an exhaust outlet. The air intake assembly, the at least one combustion chamber, and the exhaust system together defining at least in part a gas flow pathway, the air inlet defining an upstream end of the gas flow pathway, the exhaust outlet defining a downstream end of the gas flow pathway. The marine engine assembly also has a sealing valve provided in the gas flow pathway between the air inlet and the exhaust outlet. The sealing valve has an open position permitting flow of gas therethrough. The sealing valve has a closed position preventing flow of gas therethrough for hermetically sealing a portion of the gas flow pathway downstream of the sealing valve from a portion of the gas flow pathway upstream of the sealing valve. The marine engine assembly also has a propulsion device operatively connected to the engine.

In some embodiments, the sealing valve is disposed upstream of the at least one combustion chamber.

In some embodiments, the sealing valve is disposed upstream of the engine.

In some embodiments, the sealing valve is disposed downstream of the throttle valve.

In some embodiments, the sealing valve and the throttle valve are both part of an air intake valve unit.

In some embodiments, the sealing valve is the throttle valve.

In some embodiments, the air intake valve unit also has: a sealing valve actuator operatively connected to the sealing valve for moving the sealing valve between the open position and the closed position; and a throttle valve actuator operatively connected to the throttle valve for moving the throttle valve.

In some embodiments, a sealing valve actuator operatively connects to the sealing valve for moving the sealing valve between the open position and the closed position.

In some embodiments, an engine management module (EMM) is disposed in the engine unit housing and is in communication with the sealing valve actuator. The EMM controls the sealing valve actuator such that the sealing valve is in the open position when the engine is in operation. The EMM controls the sealing valve actuator such that the sealing valve is in the closed position when the engine is stopped.

In some embodiments, the engine is a two-stroke engine further comprising a crankcase and at least one transfer port fluidly communicating the crankcase with the at least one combustion chamber. The air intake assembly is fluidly connected to the crankcase for supplying air to the crankcase. The crankcase and the at least one transfer port define the gas flow pathway together with the air intake assembly, the at least one combustion chamber, and the exhaust system.

In some embodiments, the sealing valve is a ball valve.

In some embodiments, the air inlet is defined in the engine unit housing and fluidly communicates with air exterior to the engine unit housing. The air intake assembly is fluidly connected to the at least one combustion chamber for supplying air exterior of the engine unit housing to the at least one combustion chamber.

In some embodiments, a lower unit is connected to the engine unit. The lower unit includes: a lower unit housing fastened to the engine unit housing; a transmission disposed in the lower unit housing, transmission being operatively connected to the engine; and the propulsion device being operatively connected to the transmission.

In some embodiments, the propulsion device is a propeller; and the exhaust outlet is defined in the propeller.

In some embodiments, the engine unit housing is sealed such that water in which the engine unit housing is immersed is impeded from entering the engine unit housing.

In some embodiments, the air intake assembly is sealed such that fluids surrounding the air intake assembly within the engine unit housing are impeded from entering the air intake assembly.

In some embodiments, a transom bracket is connected to the engine unit housing.

In some embodiments, the transom bracket defines a tilt-trim axis. A center of mass of the engine is disposed below the tilt-trim axis at least when the marine engine assembly is in a trim range.

According to another aspect of the present technology, there is provided an air intake valve unit for controlling a supply of air to an internal combustion engine. The air intake valve unit has: a valve unit body having an upstream end and a downstream end; a throttle valve disposed in the valve unit body; and a sealing valve disposed in the valve unit body. The sealing valve has an open position permitting flow of gas therethrough. The sealing valve has a closed position preventing flow of gas therethrough for hermetically sealing a portion of the valve unit body downstream of the sealing valve from a portion of the valve unit body upstream of the sealing valve.

In some embodiments, the sealing valve is disposed between the throttle valve and the downstream end of the valve unit body.

In some embodiments, a sealing valve actuator is operatively connected to the sealing valve for moving the sealing valve between the open position and the closed position. A throttle valve actuator is operatively connected to the throttle valve for moving the throttle valve.

In some embodiments, the sealing valve is a ball valve.

According to another aspect of the present technology, there is provided a method for preventing intrusion of water into a combustion chamber of an internal combustion engine of a marine engine assembly from an exhaust system of the marine engine assembly. The method comprises: determining, by an engine management module (EMM), that the engine has stopped; and in response to determining that the engine has stopped, sending a signal from the EMM to a sealing valve actuator to close a sealing valve. The sealing valve is disposed in a gas flow pathway of the marine engine assembly. The gas flow pathway being defined at least in part by an air intake assembly of the marine engine assembly, the combustion chamber, and the exhaust system. An air inlet of the air intake assembly defines an upstream end of the gas flow pathway. An exhaust outlet of the exhaust system defines a downstream end of the gas flow pathway. When closed, the sealing valve prevents flow of gas therethrough by hermetically sealing a portion of the gas flow pathway downstream of the sealing valve from a portion of the gas flow pathway upstream of the sealing valve.

In some embodiments, the sealing valve is disposed upstream of the combustion chamber.

In some embodiments, the sealing valve is disposed upstream of the engine.

In some embodiments, the sealing valve is disposed downstream of the throttle valve.

In some embodiments, the method further comprises determining, by the EMM, that a crankshaft of the engine is turning; and determining that the crankshaft is turning, sending another signal from the EMM to the sealing valve actuator to open the sealing valve.

In some embodiments, the method further comprises engaging a starter of the engine. Sending the other signal from the EMM to the sealing valve actuator to open the sealing valve comprises sending the other signal from the EMM to the sealing valve actuator to open the sealing valve after the starter is engaged.

In some embodiments, sending the other signal from the EMM to the sealing valve actuator to open the sealing valve comprises sending the other signal from the EMM to the sealing valve actuator to open the sealing valve after the starter is engaged and before the starter is subsequently disengaged.

For purposes of this application, terms related to spatial orientation such as forward, rearward, upward, downward, left, and right, should be understood in a frame of reference of the marine engine assembly, as it would be mounted to a watercraft with a marine engine in a neutral trim position. Terms related to spatial orientation when describing or referring to components or sub-assemblies of the engine assembly separately therefrom should be understood as they would be understood when these components or sub-assemblies are mounted in the marine engine assembly, unless specified otherwise in this application. The terms "upstream" and "downstream" should be understood with respect to the normal flow direction of fluid inside a component. As such, in an engine assembly, the air intake system is upstream of the engine and the exhaust system is downstream of the engine. Similarly, for a component having an inlet and an outlet, the inlet is upstream of the outlet, and the outlet is downstream of the inlet. The term "hermetically sealed" should be understood to mean that the passage of gas through the associated device is prevented, such as in an airtight manner.

Explanations and/or definitions of terms provided in the present application take precedence over explanations and/or definitions of these terms that may be found in any documents incorporated herein by reference.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in a marine engine assembly 100 that is used to propel a watercraft and is configured to be disposed under the deck of the watercraft it propels. It is contemplated that aspects of the present technology could be used in other types of marine engine assemblies, such as in a marine outboard engines having an engine unit, a midsection connected below the engine unit, a lower unit connected below the midsection, and a transom bracket configured to connect the midsection to a watercraft.

Figure 1:
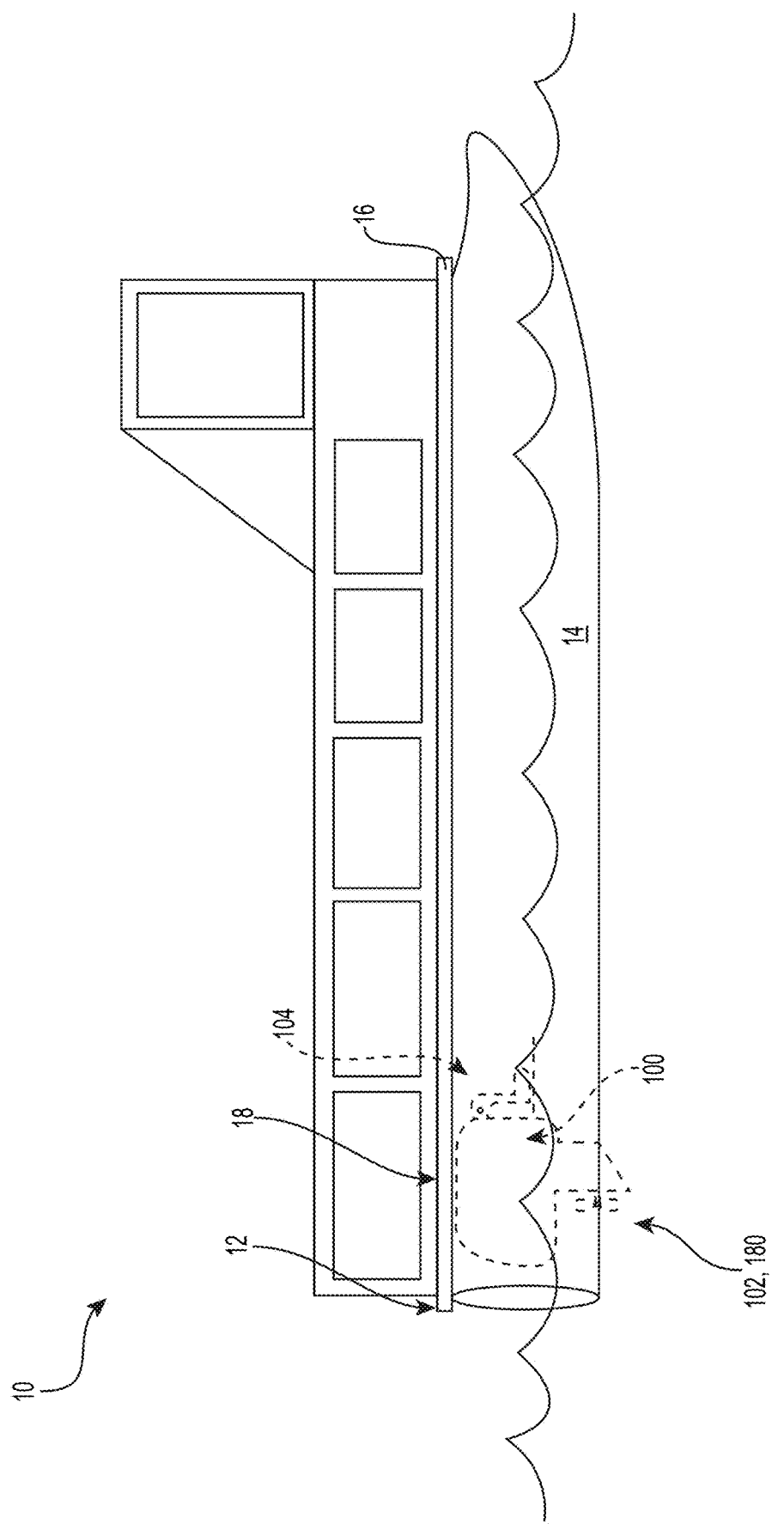
FIG. 1 is a right side elevation view of a watercraft having a marine engine assembly according to the present technology.

In FIG. 1, a watercraft 10 is illustrated. The watercraft 10 is specifically a pontoon boat 10, but this is simply one non-limiting example of a watercraft according to the present technology. This particular embodiment of the boat 10 includes a watercraft body 12 formed generally from two pontoons 14 (only one being illustrated) and a platform 16.

The boat 10 also includes a marine engine assembly 100, also referred to herein as the assembly 100. The assembly 100 is pivotably and rotatably connected to the watercraft body 12 for providing propulsion via a propulsion device 102. The propulsion device 102 is specifically a propeller 102 in the present embodiment, but it is contemplated that the propulsion device 102 could be different in some embodiments.

The assembly 100 includes a transom bracket 104 which is fastened to the watercraft body 12. As is shown schematically, the transom bracket 104 is connected to a lower portion of the platform 16, such that the assembly 100 is generally disposed below a top surface 18, also called the deck 18, of the platform 16 laterally between the pontoons 14.

With additional reference to FIGS. 2 to 6, the marine engine assembly 100, shown separately from the watercraft 10, will now be described in more detail. The assembly 100 includes an engine unit 106, a lower unit 108, and the transom bracket 104.

The engine unit 106 includes an engine unit housing 110 for supporting and covering components disposed therein. The housing 110 is sealed such that water in which the engine unit housing 110 is immersed is impeded from entering the engine unit housing 110 during normal operating conditions, including when at rest, and components of the engine inside the housing 110 are water-proofed to the same degree as in a conventional outboard engine. Depending on the specific embodiment of the housing 110 and methods used to produce a generally water-tight seal, the housing 110 could be water-proof to varying degrees. It is contemplated that the housing 110 could receive different treatments to seal the housing 110 depending on the specific application for which the marine engine assembly 100 is going to be used. In the present embodiment, the housing 110 includes a cowling 112. The cowling 112 is fastened to the rest of the housing 110 along a diagonally extending parting line 114. A seal (not shown) is provided between the cowling 112 and the rest of the housing 110 along the parting line.

The engine unit 106 includes an internal combustion engine 116 disposed in the engine unit housing 110 for powering the assembly 100 and for driving the propeller 102. By removing the cowling 112, the engine 116 can be accessed, as shown in FIGS. 3 to 6. In the present embodiment, the internal combustion engine 116 is a three-cylinder, two-stroke, gasoline-powered, direct injected internal combustion engine. It is contemplated that the internal combustion engine 116 could be a four-stroke internal combustion engine. It is contemplated that the engine 116 could have more or less than three cylinders. In some embodiments, the internal combustion engine 116 could use a fuel other than gasoline, such as diesel.

Figure 7:
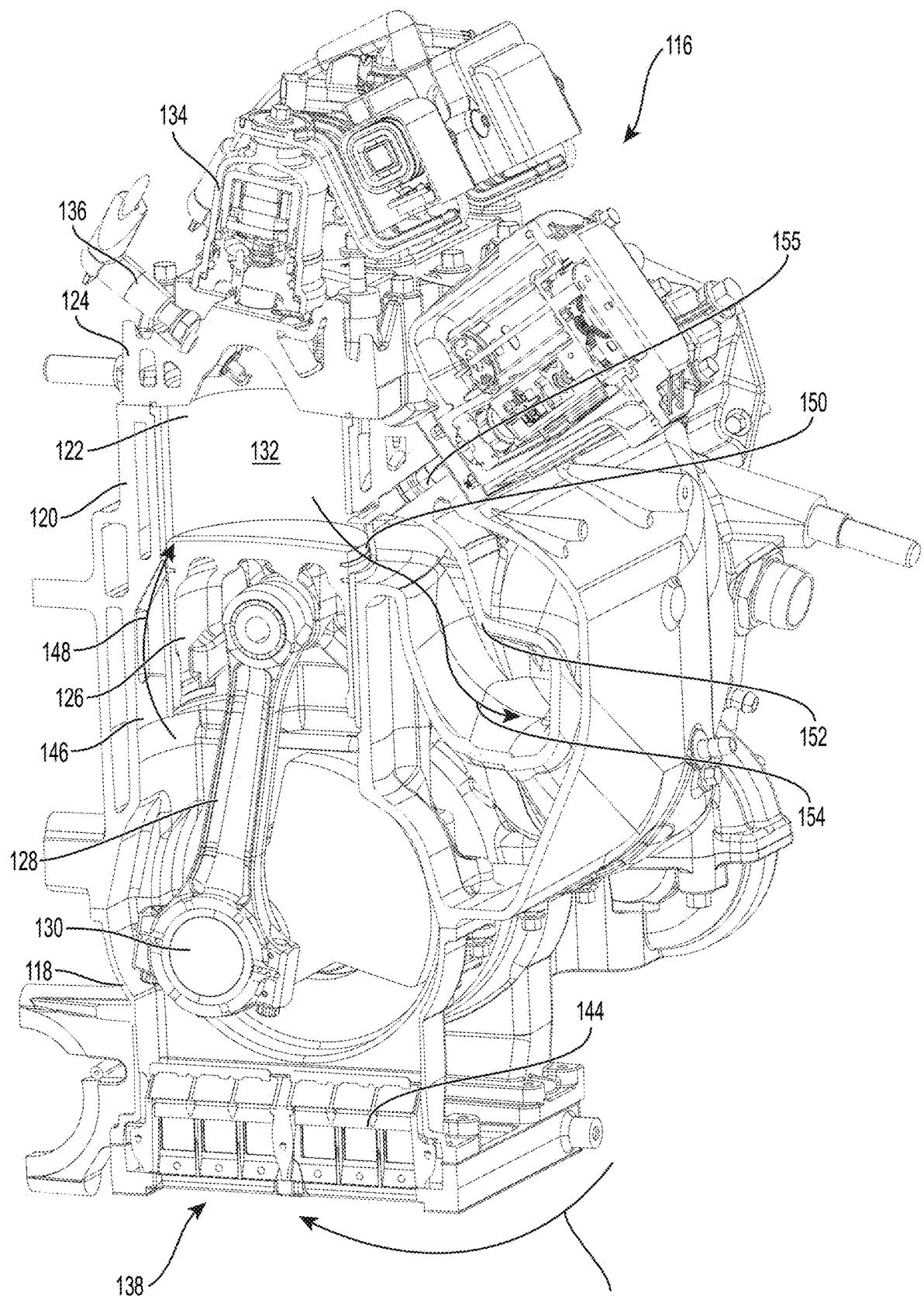
FIG. 7 is a perspective view, taken from a rear, right side of a vertical cross-section of an engine, an exhaust system and other components of the marine engine assembly of FIG. 3, the vertical cross-section being taken laterally through a center of a middle cylinder of the engine.

With reference to FIG. 7, the engine 116 includes a crankcase 118. A cylinder block 120 defining three cylinders 122 (one of which is shown) is disposed above the crankcase 118. A cylinder head 124 is disposed on top of the cylinder block 120. Each cylinder 122 has a piston 126 reciprocally received inside of it. Each piston 126 is connected by a corresponding connecting rod 128 to a crankshaft 130. The crankshaft 130 rotates in the crankcase 118. For each cylinder 122, the piston 126, the cylinder 122 and the cylinder head 124 define together a combustion chamber 132. For each combustion chamber 132, a direct fuel injector 134 supported by the cylinder head 124 is provided to inject fuel into the combustion chamber 132, and a spark plug 136 extends into the combustion chamber 132 through the cylinder head 124 to ignite an air-fuel mixture inside the combustion chamber 132.

The engine 116 includes one air intake 138 per cylinder 122. The air intakes 138 are provided at the bottom of the crankcase 118. Air is delivered to the air intakes 138 by an air intake assembly 140 (FIG. 3), described in more detail below, as indicated by arrow 142. The air passes through reed valves 144 provided in the crankcase 118 adjacent the air intakes 138. The reed valves 144 allow air to enter the crankcase 118 but help prevent air from exiting the crankcase 118. For each cylinder 122, a transfer port 146 communicates the crankcase 118 with the corresponding combustion chamber 132 for air to be supplied to the combustion chamber 132 as indicated by arrow 148.

Figure 8:
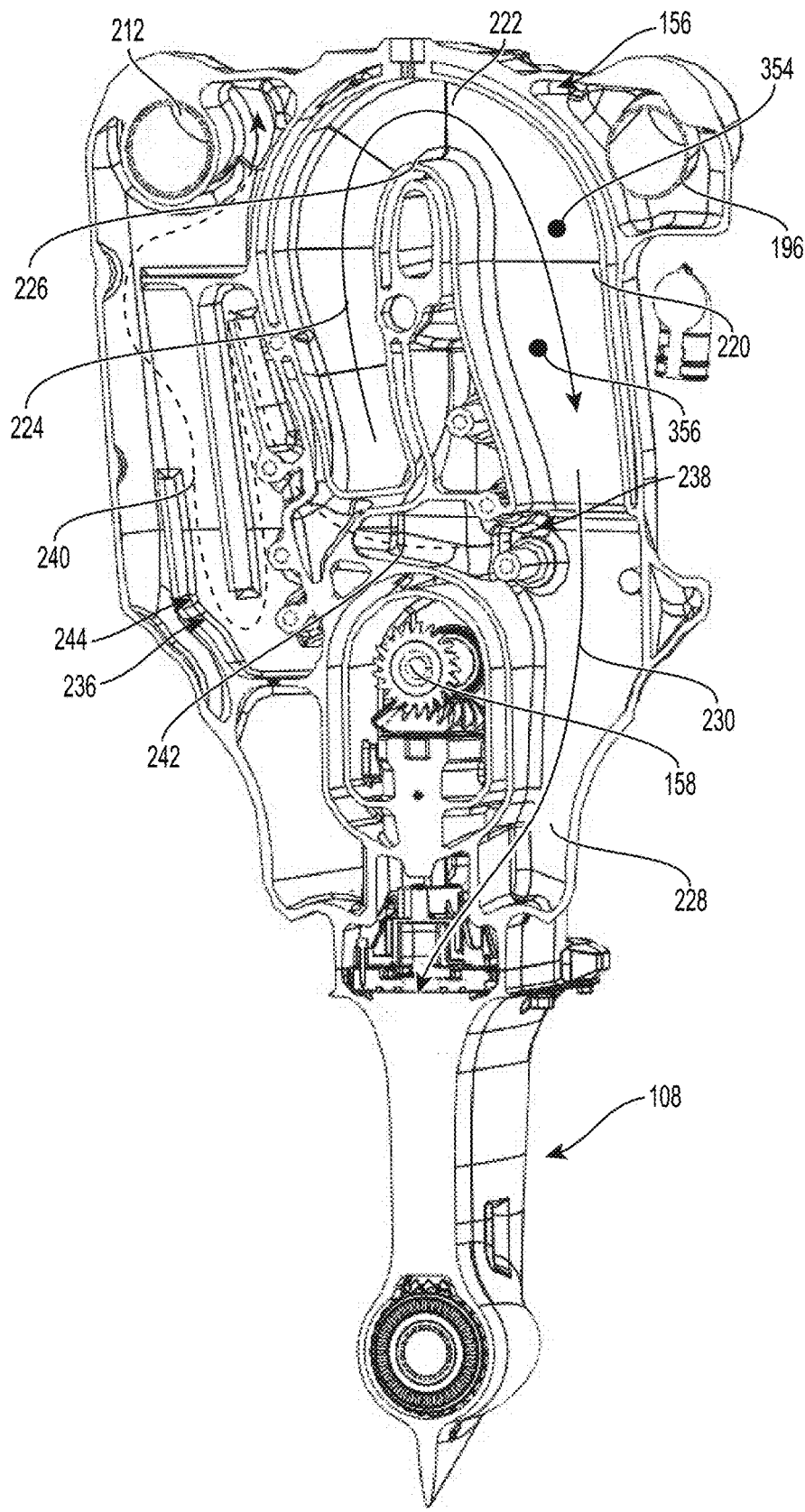
FIG. 8 is a perspective view, taken from a rear, right side of a vertical cross-section of the marine engine assembly of FIG. 3, taken through line 8-8 of FIG. 3.
Figure 9:
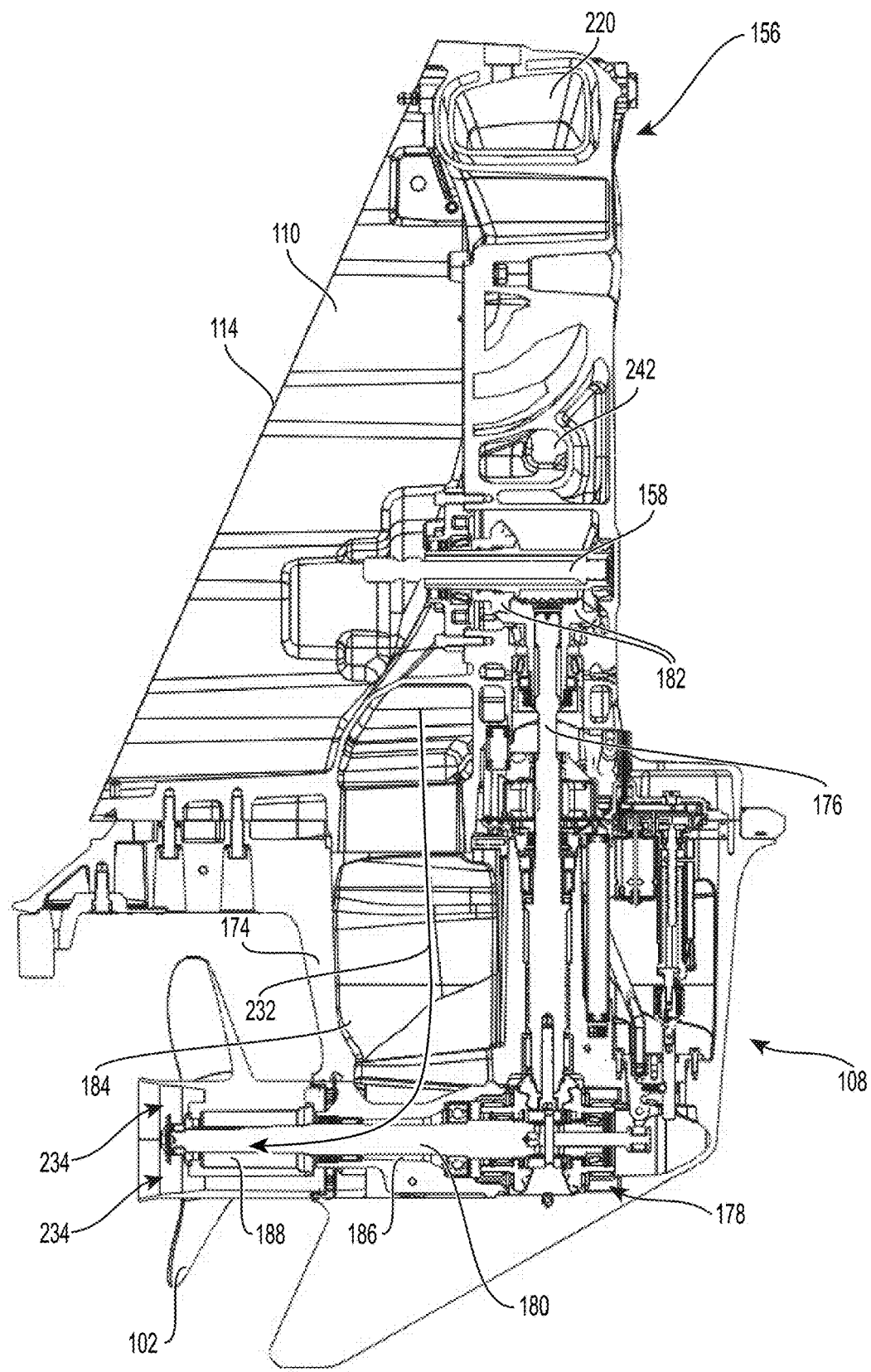
FIG. 9 is a vertical cross-section view of a front portion of the marine engine assembly of FIG. 3, with the engine and some associated components having been remove, the vertical cross-section being taken longitudinally along a lateral center of the marine engine assembly.
Figure 10:
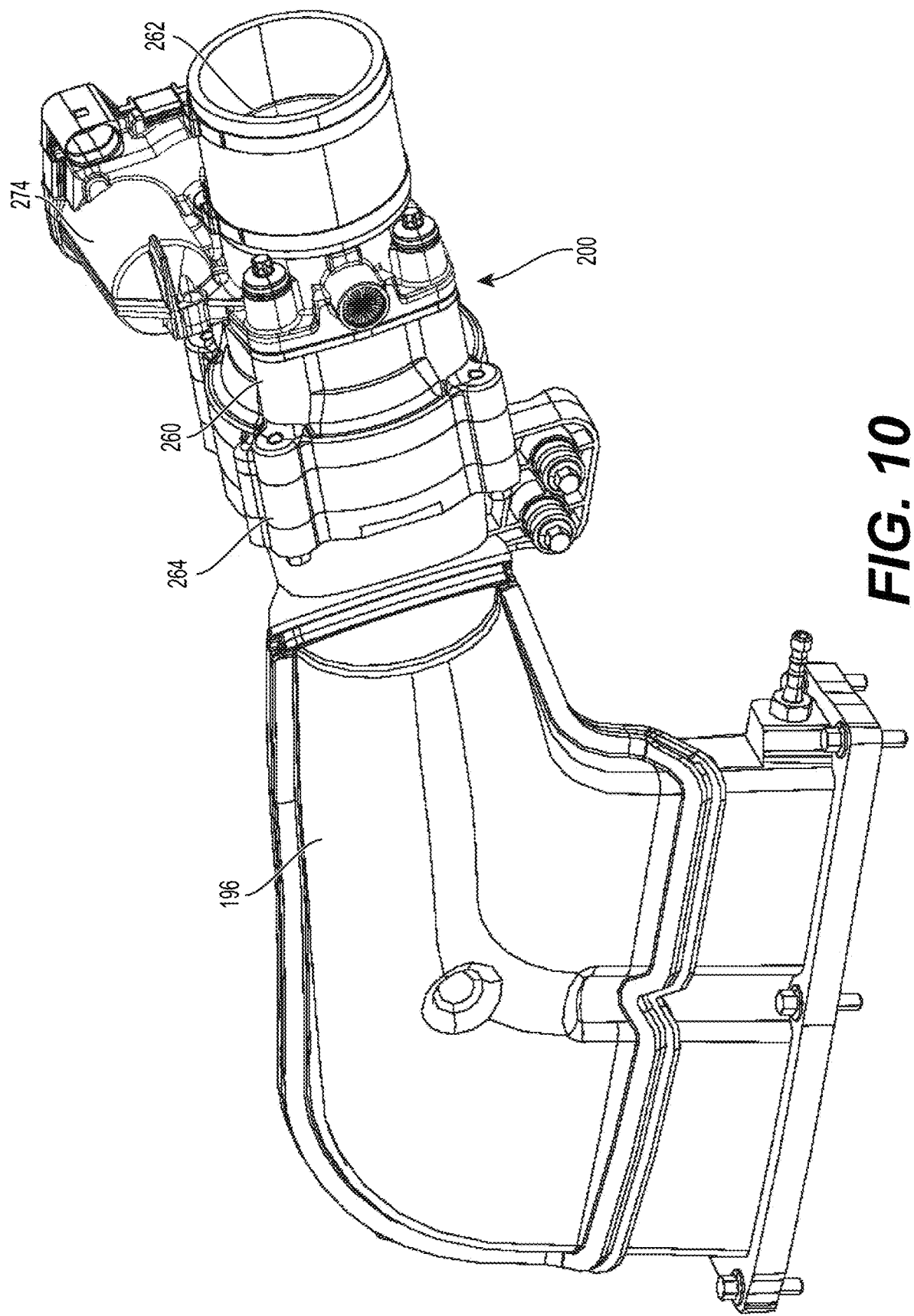
FIG. 10 is a perspective view taken from a front, right side of an air intake valve unit and an air intake plenum of the marine engine assembly of FIG. 3.

Each combustion chamber 132 has a corresponding exhaust port 150. Exhaust gases flow from the combustion chambers 132, through the exhaust ports 150, into an exhaust manifold 152 as indicated by arrow 154. Each exhaust port 150 has a corresponding reciprocating exhaust valve 155 that varies the effective cross-sectional area and timing of its exhaust port 150. From the exhaust manifold 152, the exhaust gases are routed out of the marine engine assembly 100 via the other portions of an exhaust system 156 (some of which are shown in FIGS. 8 and 9), described in more detail below.

Figure 2:
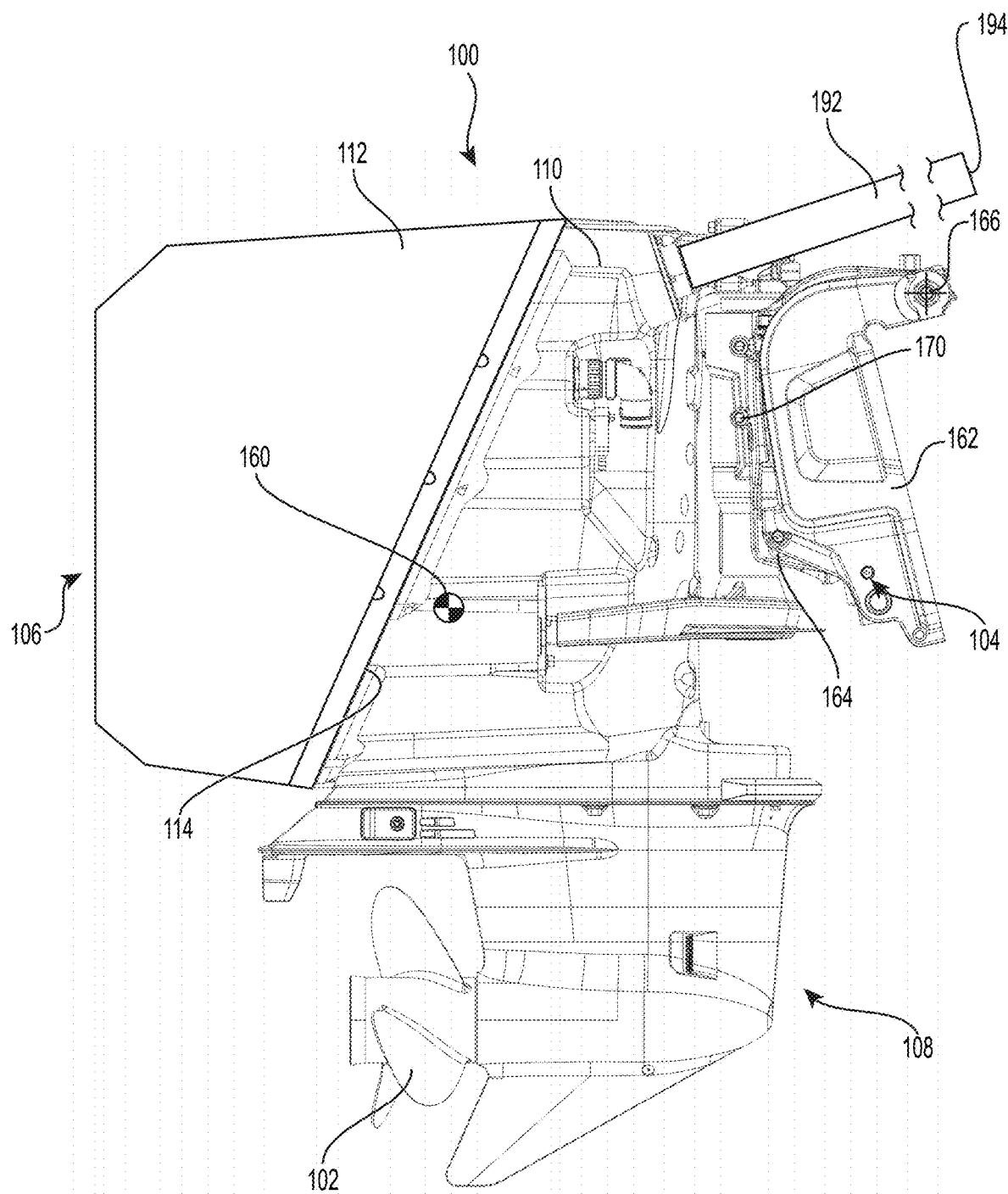
FIG. 2 is a right side elevation view of the marine engine assembly of the watercraft of FIG. 1.

The reciprocation of the pistons 126 causes the crankshaft 130 to rotate. The crankshaft 130 drives an output shaft 158 (FIGS. 8 and 9) which drives the propeller 102, as is described in more detail below. With reference to FIG. 2, a center of mass 160 of the engine 116 is disposed vertically in a lower half of the engine unit 110, and longitudinally about halfway along a length of the crankshaft 130, although the exact position of the center of mass 160 depends on the details of a particular embodiment of the engine 116.

Figure 3:
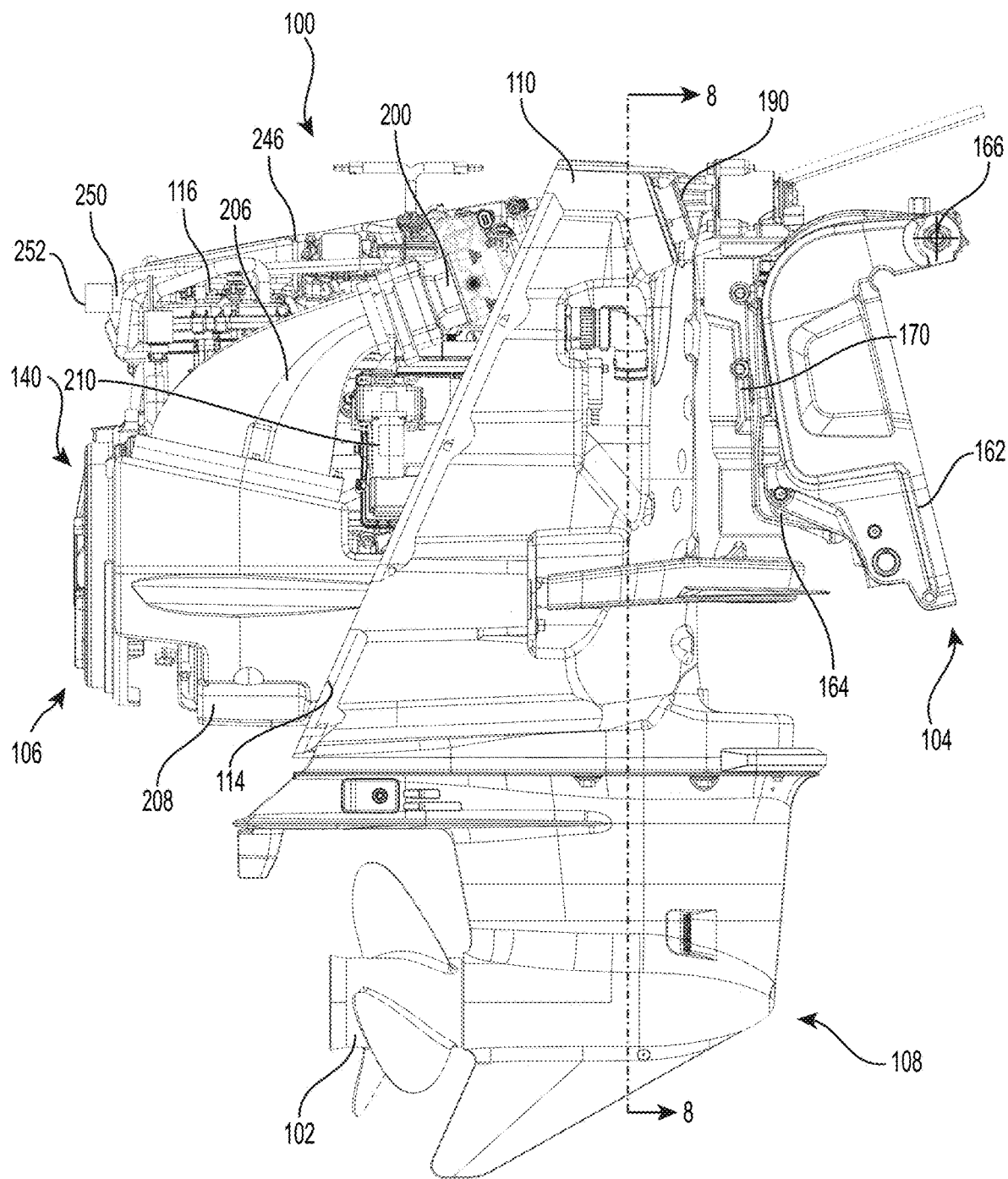
FIG. 3 is a right side elevation view of the marine engine assembly of FIG. 2, with a portion of a housing of the marine engine assembly having been removed.
Figure 4:
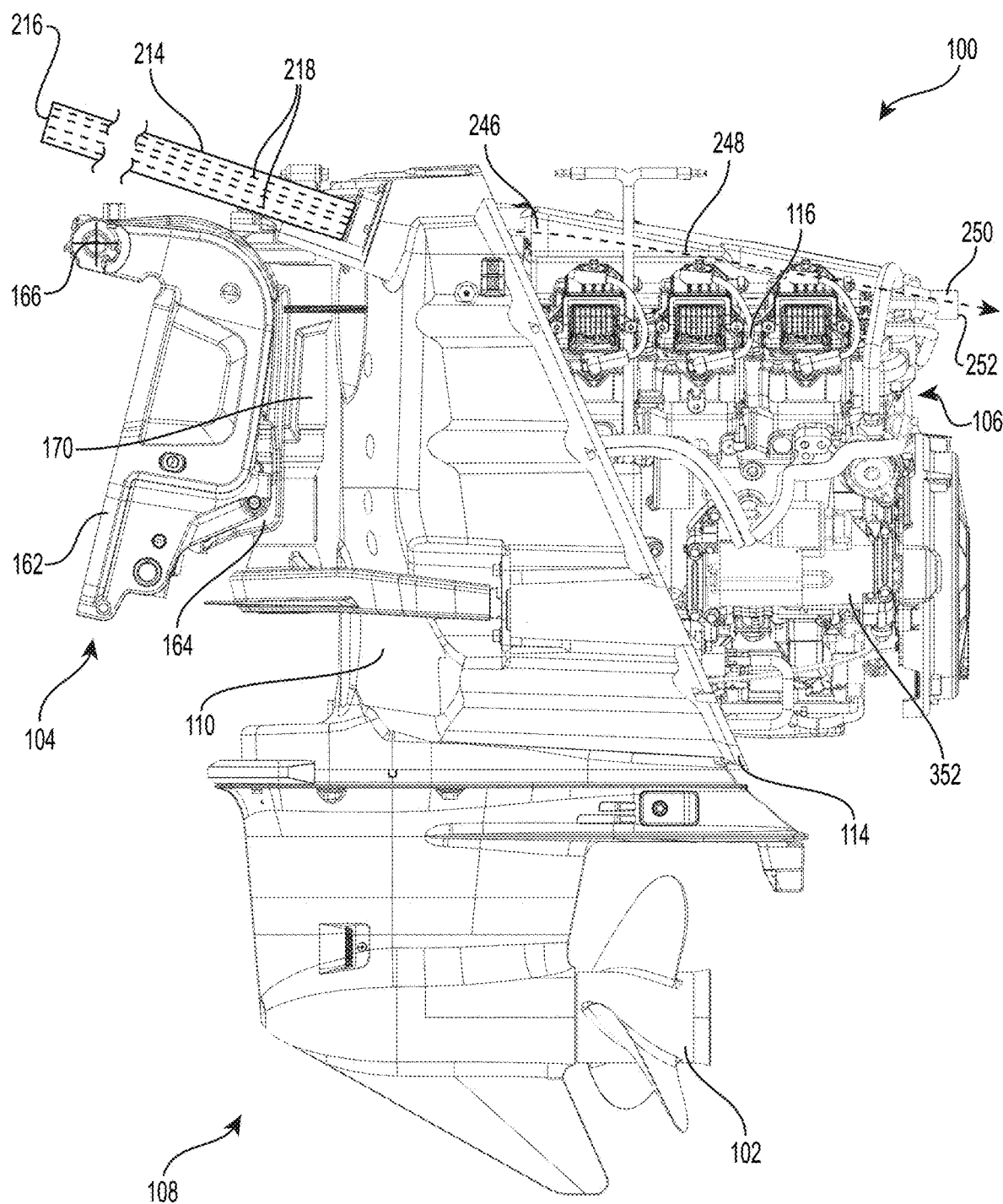
FIG. 4 is a left side elevation view of the marine engine assembly of FIG. 3.
Figure 5:
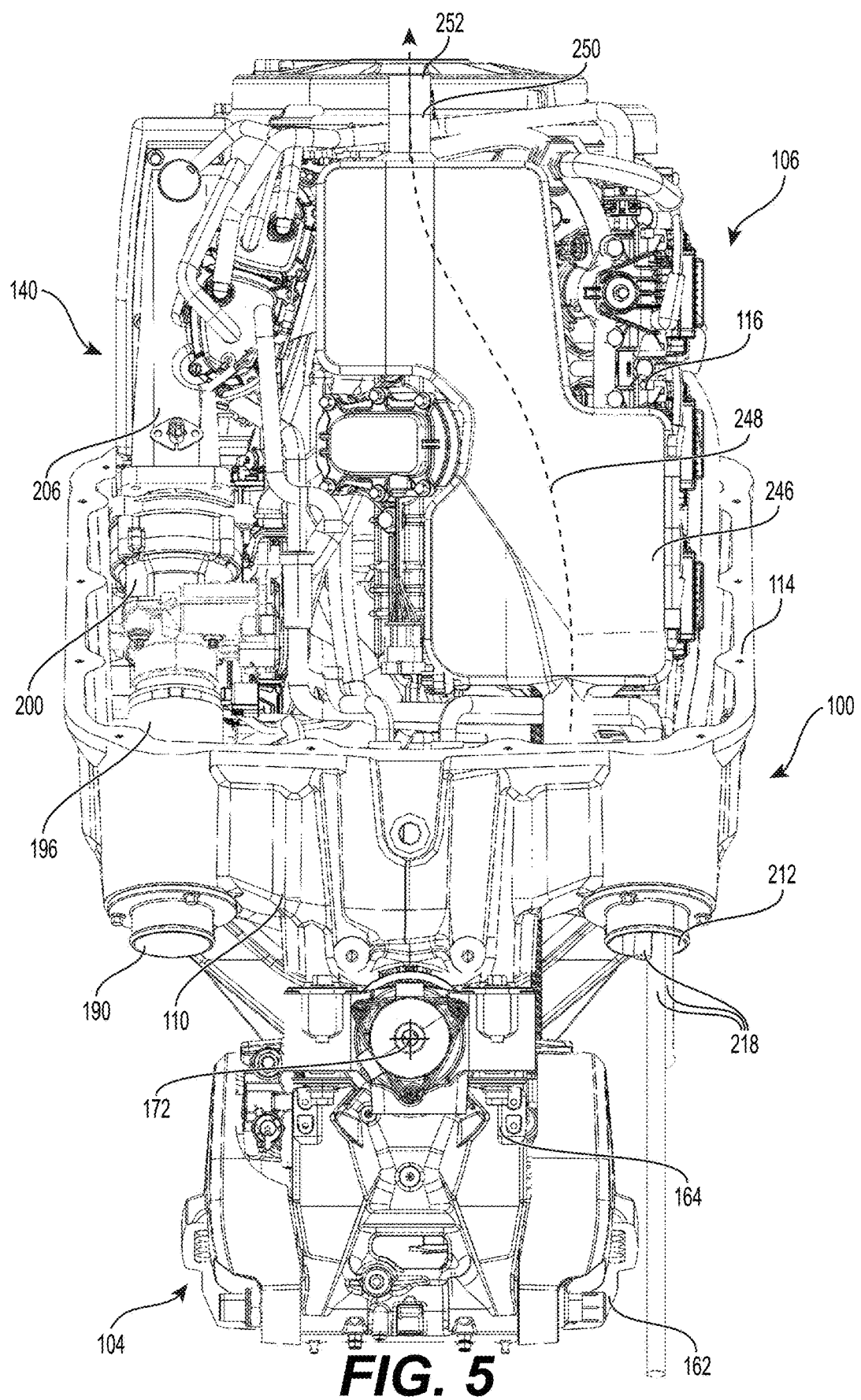
FIG. 5 is a top plan view of the marine engine assembly of FIG. 3.

Returning to FIGS. 2 to 5, the transom bracket 104 includes a watercraft portion 162 which is adapted for fastening to the watercraft body 12. The bracket 104 also includes an engine portion 164, pivotally connected to the watercraft portion 162, and which is fastened to the engine unit housing 110. The engine portion 164 is pivotable with respect to the watercraft portion 162 about a tilt-trim axis 166. The transom bracket 104 thus defines the tilt-trim axis 166 of the marine engine assembly 100, about which the assembly 100 can be trimmed or tilted relative to the watercraft body 12. The engine portion 164 of the transom bracket 106 includes a tilt/trim actuator 168 (not shown in FIGS. 2 to 5, schematically shown in FIG. 20) for tilting or trimming the assembly 100 relative to watercraft body 12. In one embodiment, the tilt/trim actuator 168 is a linear hydraulic actuator adapted for pushing the engine portion 164 away from the watercraft portion 162, but other types of tilt/trim actuators 168 are contemplated, such as that described in US Patent Application Publication No. 2019-0233073, the entirety of which is incorporated herein by reference. The engine portion 164 includes steering actuator 170 configured for steering the engine unit 106 and the lower unit 108 relative to the transom bracket 104 about a steering axis 172 (FIG. 5). In the present embodiment, the steering actuator 170 is a rotary hydraulic actuator, but other types of steering actuators 170 are contemplated.

As can be seen in FIG. 2, the center of gravity 160 of the engine 116 is disposed below the tilt-trim axis 116, when the assembly 100 is in a trim range. As the assembly 100 is designed to be disposed below the deck 18, the engine 116 and the transom bracket 104 partially vertically overlap, rather than the engine 116 being disposed well above the bracket 104 as would be the case in a conventional outboard engine assembly meant to extend higher relative to the watercraft body 12. In the present embodiment, the center of gravity 160 is vertically between a top end of the transom bracket 104 and a bottom end of the transom bracket 104.

Turning now to FIG. 9, the lower unit 108 includes a lower unit housing 174, which is fastened to the engine unit housing 110. The lower unit 108 also includes a driveshaft 176, a transmission 178, a propeller shaft 180 and the propeller 102. The driveshaft 176 is driven by the output shaft 158 via bevel gears 182. The driveshaft 176 drives the transmission 178. The transmission 178 selectively drives the propeller shaft 180 to which the propeller 102 is connected. The assembly 100 is said to be in the trim range when the propeller shaft 180 is less than fifteen degrees from horizontal. In other embodiments, this angle could be different, such as thirty degrees from horizontal for example.

The lower unit housing 174 defines an exhaust passage 184 for receiving exhaust from the engine 116. The exhaust passage 184 is fluidly connected with channels 186 near the propeller shaft 180. The channels 186 fluidly connect to passages 188 in the propeller 102 which allow exhaust gas to leave the marine engine assembly 100 under water.

With additional reference to FIGS. 2, 3, 6, 10 and 11, the air intake assembly 140 will now be described in more detail. As mentioned above, the air intake assembly 140 is disposed in the engine unit housing 110. The air intake assembly 140 forms a conduit between an exterior of the engine unit housing 110 and the engine 116 for providing air for combustion. The air intake assembly 116 is sealed such that surrounding fluids in the engine unit housing 110, such as any air and water present in the engine unit housing 110, are impeded from entering the air intake assembly 140 and thereby will not enter the engine 116 via the air intake assembly 140. Instead, the air intake assembly 140 delivers air from outside the housing 110 to the engine 116 directly, delivering the air needed for combustion in the engine 116.

Figure 6:
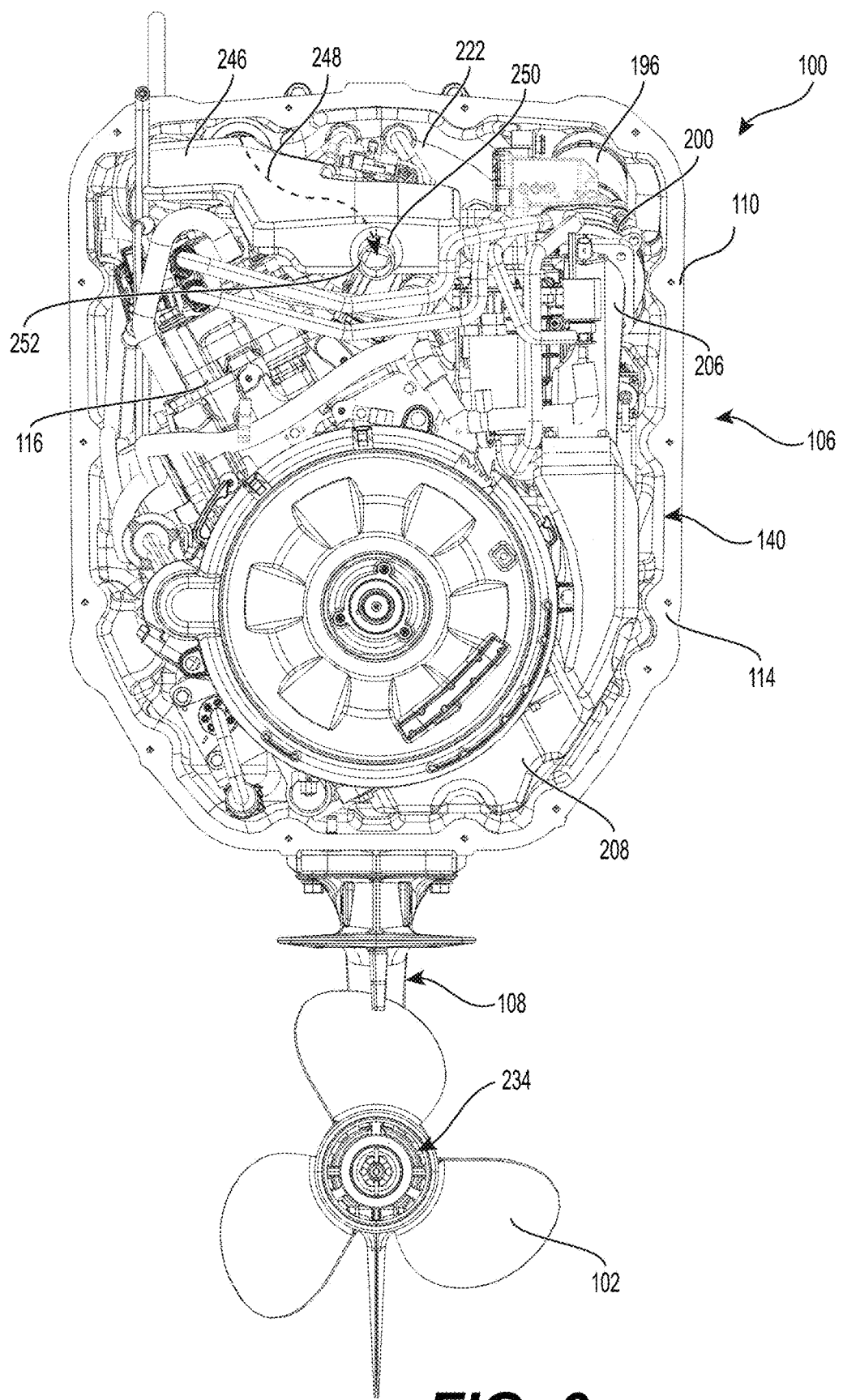
FIG. 6 is a rear elevation view of the marine engine assembly of FIG. 3.

As best seen in FIG. 6, the air intake assembly 140 extends generally along the right side of the engine unit housing 110 and is disposed mainly between the engine 116 and the right side of the housing 110 and partially below the engine 116. In some embodiments, all or part of the air intake assembly 140 could extend along the left, front, rear, top or other sides of the housing 110, depending on the arrangement of the engine 116 and more specifically the arrangement of the engine air intakes 138. It is also contemplated that all or part of the air intake assembly 140 could extend above the engine 116, depending on the particular embodiment of the engine 116.

The air intake assembly 140 defines an air inlet 190 in the engine unit housing 110 on a top, front, right side thereof, that fluidly communicates with air exterior to the engine unit housing 110 and three outlets (not shown) fluidly connected to the three air intakes 138 of the engine 116. The air inlet 190 is fluidly connected to an external conduit 192 (FIG. 2). The external conduit 192 includes an inlet 194 (FIG. 2) located onboard the watercraft 10. The external conduit 192 is supported by the watercraft body 12. The external conduit 192 delivers air from above the water line to the air intake assembly 140, via the external conduit 192.

Figure 11:
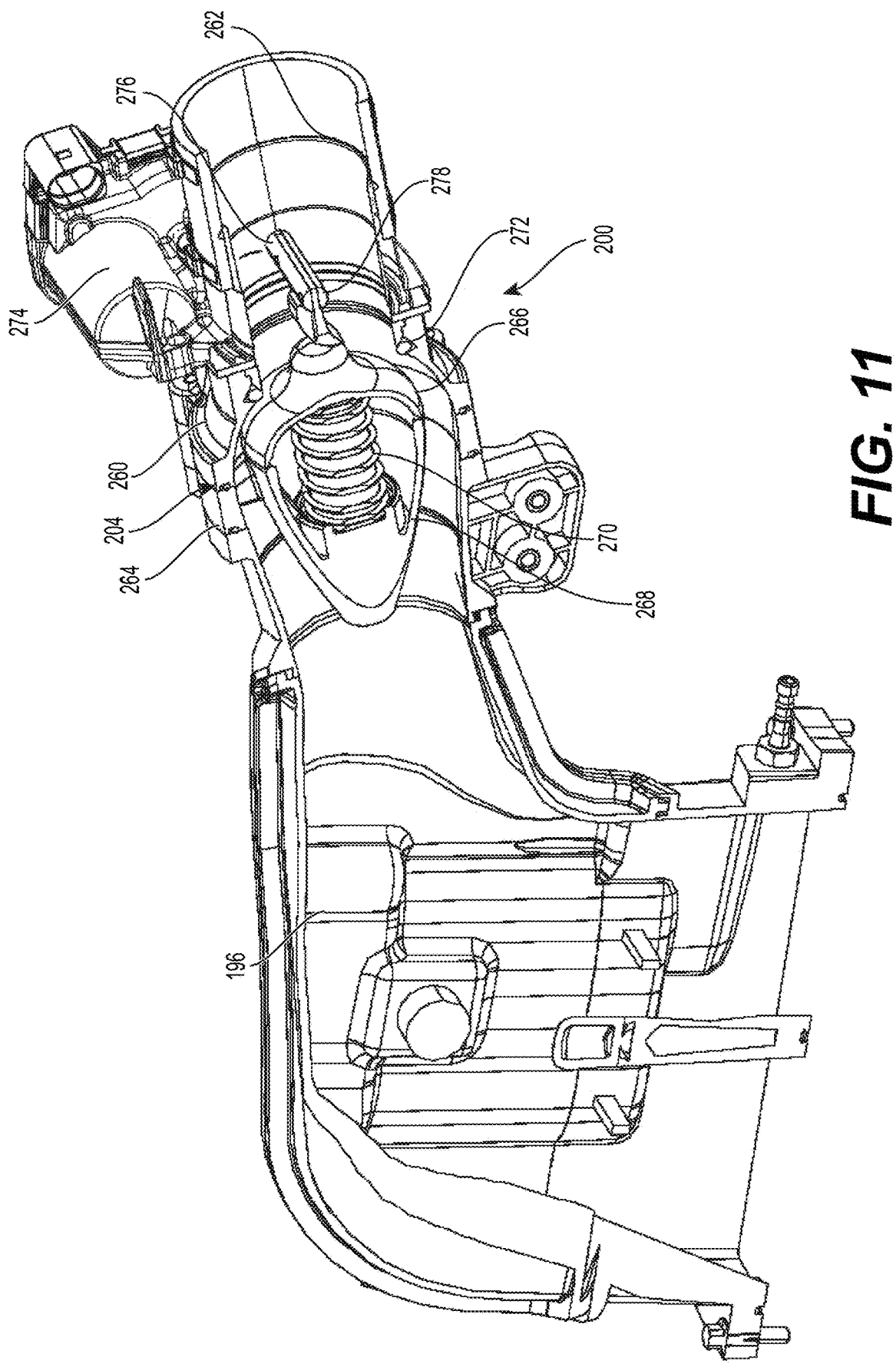
FIG. 11 is a perspective view, taken from a front, right side of a vertical cross-section of the air intake valve unit and the air intake plenum of FIG. 10, the cross-section being taken longitudinally.
Figure 12:
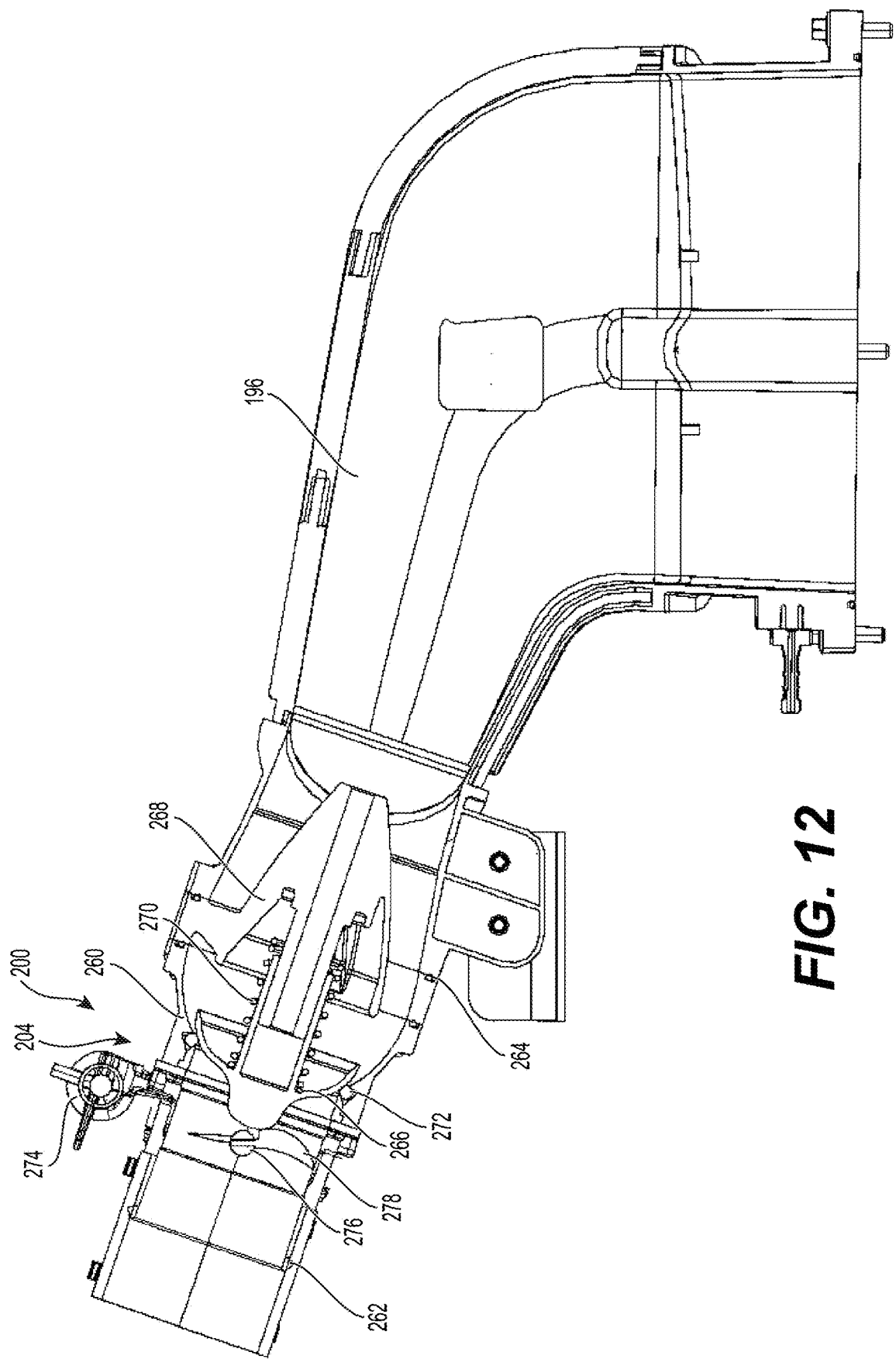
FIG. 12 is a vertical and longitudinal cross-section taken along a lateral center of the air intake valve unit and the air intake plenum of FIG. 10, with a throttle valve and a sealing valve of the air intake valve unit both being closed.
Figure 13:
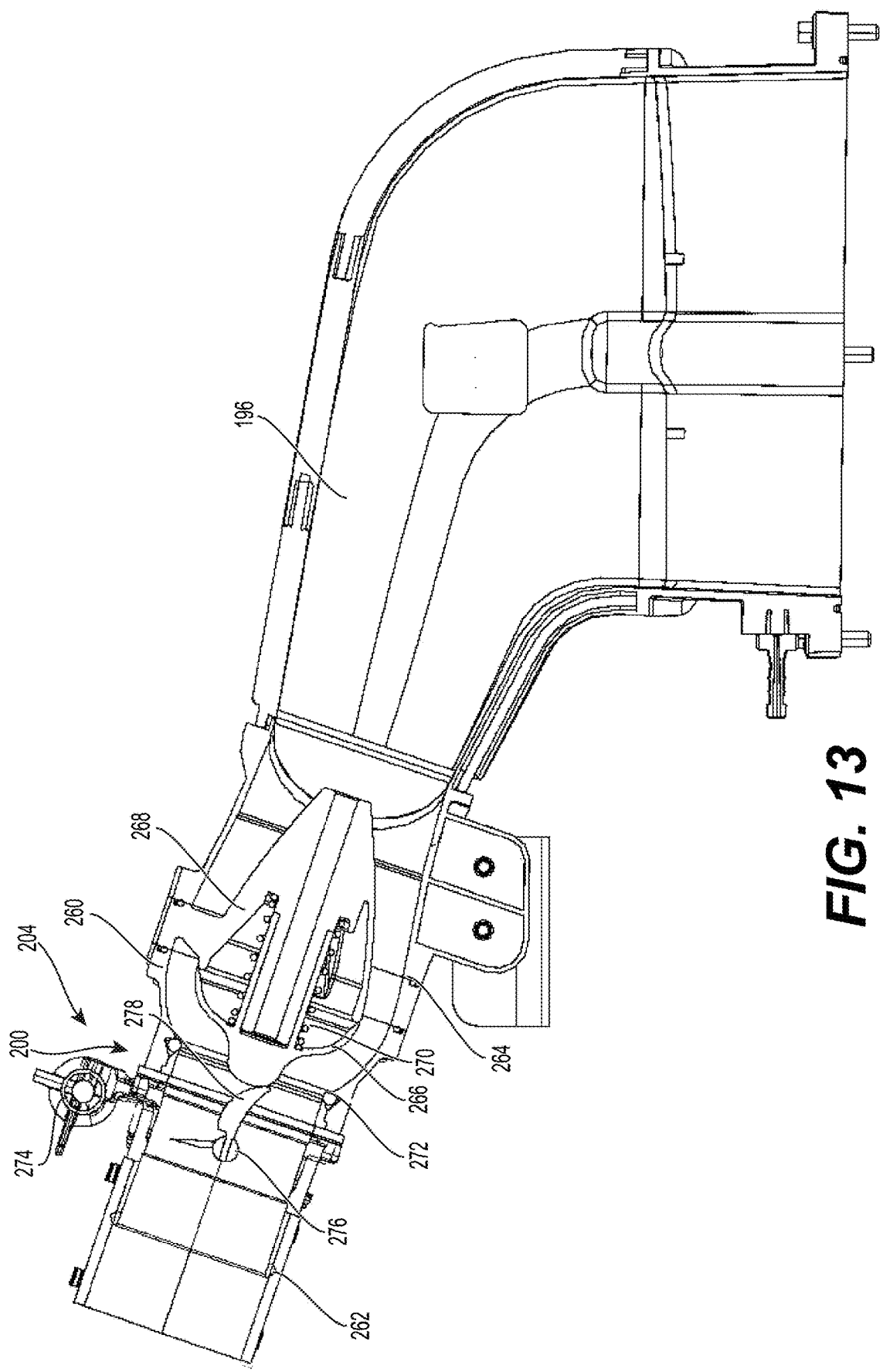
FIG. 13 is the cross-section of FIG. 12, with the throttle valve and the sealing valve both being open.
Figure 14:
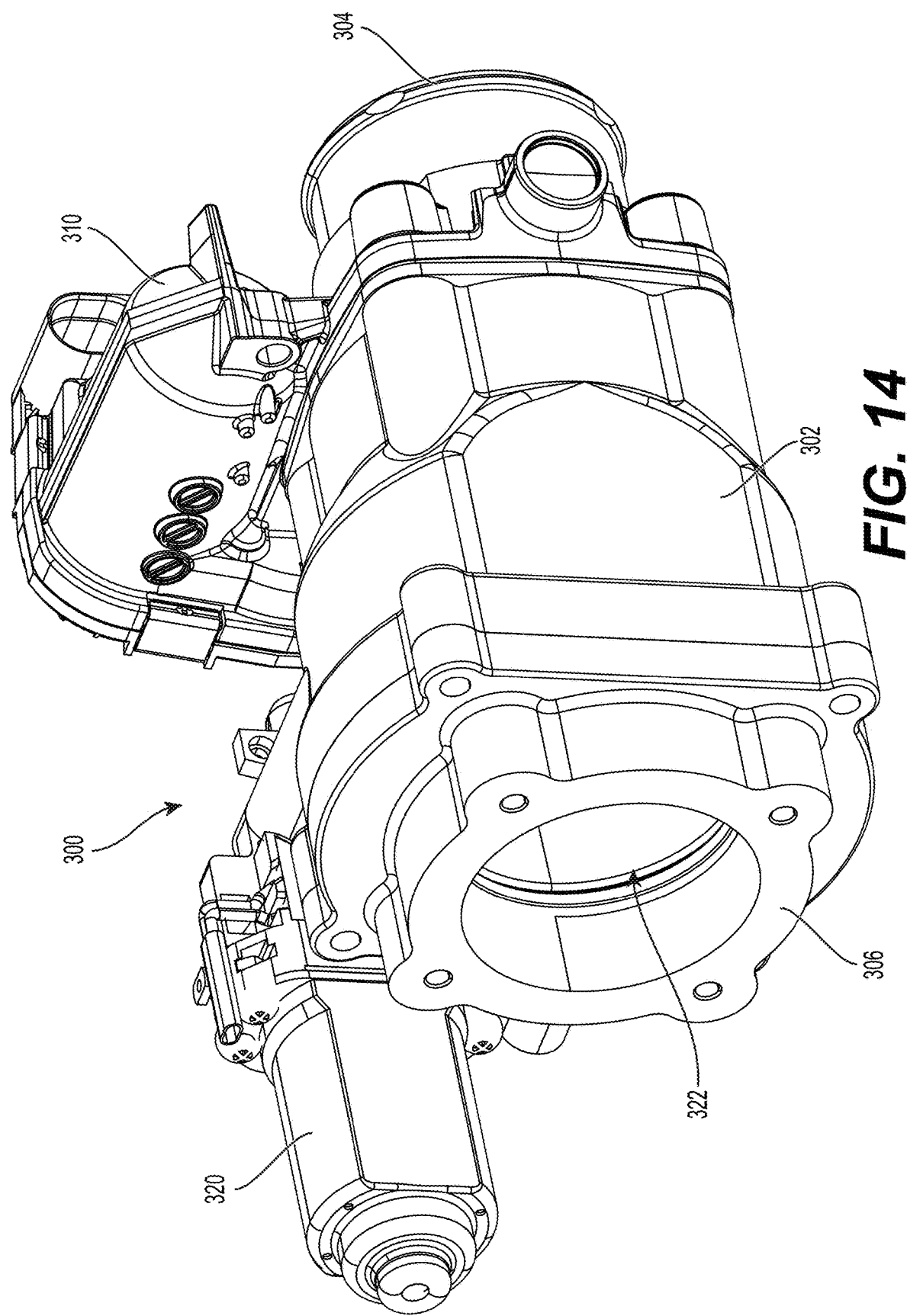
FIG. 14 is a perspective view taken from a rear, right side of an alternative embodiment of the air intake valve unit of FIG. 10.
Figure 15:
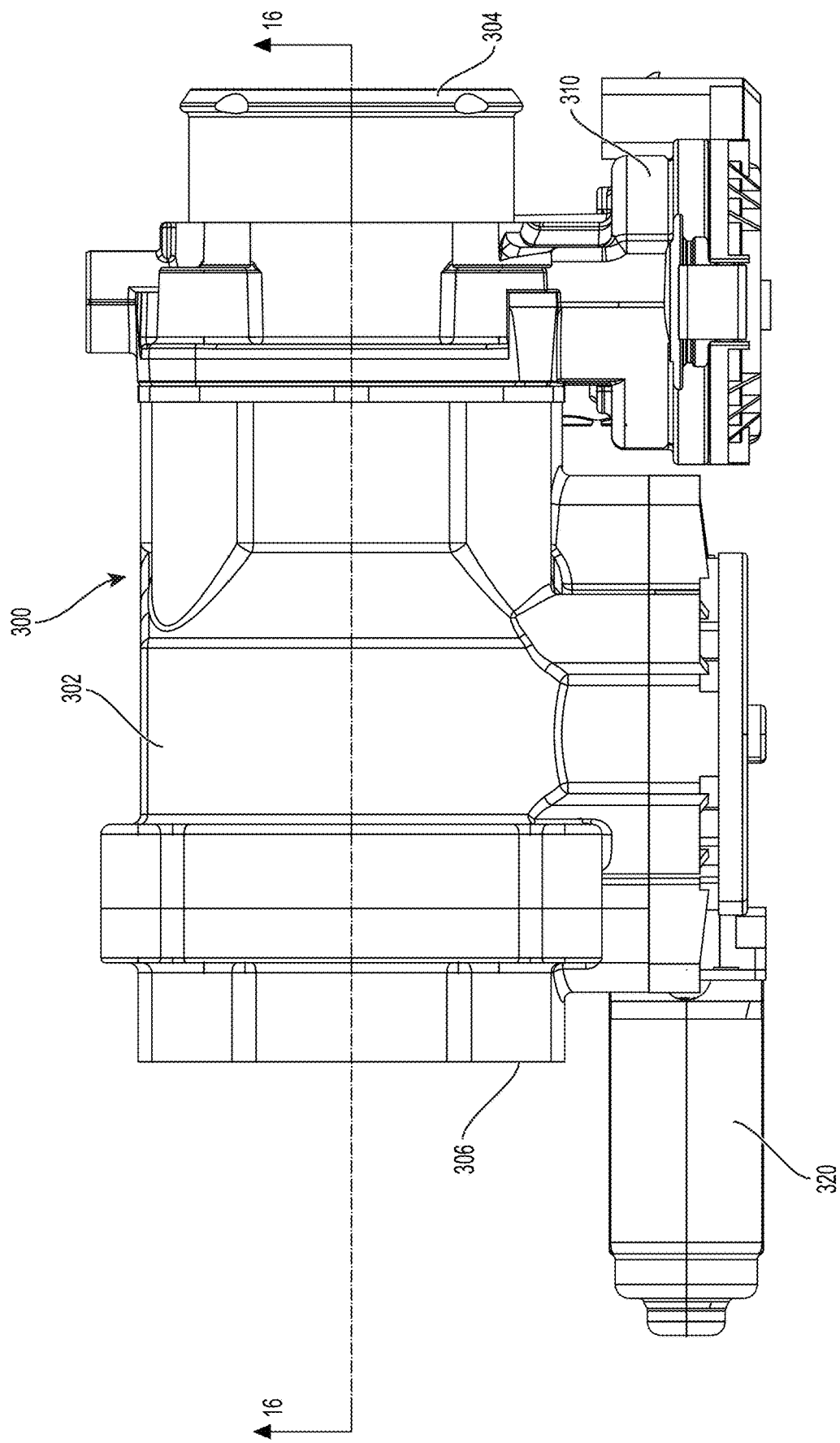
FIG. 15 is a bottom view of the air intake valve unit of FIG. 14.

Additional components of the air intake assembly 140 will now be described in more detail. An intake conduit 196 (FIG. 5) connects to the air inlet 190 and extends rearward and downward therefrom inside the engine unit housing 110 on a right side of the engine 116. An air intake valve unit 200 disposed on a right side of the engine 116 has an upstream end connected to a downstream end of the intake conduit 196. The air intake valve unit 200 has valve 204 that acts as both a throttle valve and a sealing valve (FIG. 11). The air intake valve unit 200 will be described in more detail below. A plenum 206 is connected to a downstream end of the air intake valve unit 200. As can be seen in FIG. 3, the plenum 206 diverges as it extends rearward and downward from the air intake valve unit 200. As can be seen in FIG. 6, the lower end of the plenum 206 is connected to an air intake manifold 208. The air intake manifold 208 connects to the bottom of the crankcase 118 to supply air to the air intakes 138 of the engine 116. It is contemplated that some or all of the components of the air intake assembly 140 could be disposed on any other side or sides of the engine 116.

As can be seen in FIG. 3, an air pump 210 is disposed inside the engine unit housing 110. The air pump 210 is powered by a battery (not shown) provided on the boat 10. The air pump 210 is connected to a right side of the engine 116 below the air intake unit 200 and in front of the plenum 206. It is contemplated that the air pump 210 could be provided elsewhere inside the engine unit housing 110. The air pump 210 selectively supplies air from inside the engine unit housing 110 to the air intake manifold 208 as will be described in more detail below.

As can be seen in FIG. 5, the engine unit housing 110 defines an aperture 212 on a top, front, left side thereof, that fluidly communicates with air exterior to the engine unit housing 110. The aperture 212 is fluidly connected to an external conduit 214 (FIG. 4). The external conduit 214 includes an inlet 216. The external conduit 214 is supported by the watercraft body 12. The external conduit 214 is used for the routing of lines 218 that extend from components disposed inside the engine unit housing 110, then pass through the aperture 212 and the external conduit 214 to connect to components provided on the watercraft 10. The lines 218 include, but are not limited to, battery cables to connect components inside the engine unit housing 110 to one or more batteries provided on the watercraft 10, communication lines for exchanging signals between components inside the engine unit housing 110 and components provided on the watercraft 10 such as display gauges, a throttle input, and a transmission input, and a fuel line for supplying fuel from a fuel tank on the watercraft 10 to the fuel injectors 134. It is also contemplated that the lines 218 can include an oil supply hose for connecting an oil pump inside the engine unit housing 110 with an external oil tank located onboard the watercraft 10. The external conduit 214 also allows the exchange of air between an exterior of the engine unit housing 110 above the water line and the inside of the engine unit housing 110, thereby permitting the air pump 210 to supply this air to the air intake assembly 140.

Turning now to FIGS. 7 to 9, the exhaust system 156 will be described in more detail. As previously mentioned and as shown in FIG. 7, each combustion chamber 132 has a corresponding exhaust port 150. Exhaust gases flow from the combustion chambers 132, through the exhaust ports 150, into the exhaust manifold 152 as indicated by arrow 154. From the exhaust manifold 152, the exhaust gases flow forward into an exhaust pipe (not shown) and then into an exhaust pipe 220 located at a front of the engine unit housing 110, in front of the engine 116. As can be seen in FIG. 8, the exhaust pipe 220 extends upward, then curves and extends downward, thus forming a gooseneck having an apex 222. Exhaust gas flows in the exhaust pipe 220 in the direction indicated by arrow 224. The inner portion 226 of the apex 222 is vertically higher than the top of the combustion chambers 132 when the marine engine assembly 100 is in the trim range to help prevent intrusion of water into the combustion chambers 132 from the exhaust system 156. From the exhaust pipe 220, the exhaust gas flows downward and under the output shaft 158 via an exhaust passage 228, as indicated by arrow 230. From the exhaust pipe 228, the exhaust gases enter the lower unit housing 174. With reference to FIG. 9, as indicated by arrow 232, the exhaust gases flow through the exhaust passage 184, then through the channels 186, and finally through the passages 188 in the propeller 102. The ends of the passages 188 define the exhaust gas outlets 234 of the exhaust system 156.

During operation of the marine engine assembly 100, such as when the engine is idling or operating at trolling speeds, the exhaust gas pressure may become too low to keep the water out of the lower portion of the exhaust system 156. Under these conditions, this can result in water entering the passages 188, the channels 186, the exhaust passage 184, and rising into the exhaust passage 228 up to the same level as the water outside of the marine engine assembly 100 (i.e. up to the waterline). As this water blocks the exhaust outlets 234, the exhaust system 156 includes an idle relief passage 236 to allow the exhaust gases to flow out of the marine engine assembly 100 to the atmosphere. With reference to FIG. 8, the idle relief passage 236 has an idle relief passage inlet 238 communicating with the exhaust passage 228. As indicated by the dotted-line arrow 240, from the idle relief passage inlet 238 the exhaust gases flow left trough a passage 242, then through a tortuous passage 244. With reference to FIGS. 4 to 6, from a top of the tortuous passage 244, the exhaust gases flow rearward through an idle relief muffler 246 disposed on top of the engine 116 as indicated by dotted-line arrow 248. From the idle relief muffler 246, the exhaust gases flow through a pipe 250 that extends through a rear of the cowling 112. The outlet of the pipe 250 is an idle relief passage outlet 252 of the idle relief passage 236. The idle relief passage outlet 252 is near a top of the engine unit housing 110 so as to be above the waterline during typical operation of the marine engine assembly 100. It is contemplated that the idle relief passage outlet 252 could be disposed on the front, top or sides of the engine unit housing 100. It is contemplated that the idle relief passage outlet 252 could be located at other positions that are vertically higher than the exhaust outlets 234 at least when the marine engine assembly 100 is in the trim range. It is contemplated that the idle relief muffler 246 could be omitted.

The air intake assembly 140, the crankcase 128, the transfer ports 146, the combustion chambers 132, and the exhaust system 156 together define a gas flow pathway. The gas flow pathway is the path through which gas (air or exhaust gas depending on the location) flows from the point it enters the engine unit housing 110 to be supplied to the engine 116 to the point at which it is exhausted from the marine engine assembly 100. The air inlet 190 defines the upstream end of the gas flow pathway. The exhaust outlets 234 define the downstream end of the gas flow pathway. In embodiments where the engine 116 is a four-stroke engine, as the engine 116 has no transfer ports, and since the air does not flow through the crankcase before reaching the combustion chambers, the gas flow pathway would not include the crankcase and transfer ports.

As described above, the marine outboard engine 100 is provided with various features to help prevent entry of water into the combustion chambers 132 of the engine 116. Although these are effective for most conditions, there could be some rare conditions, especially when the engine 116 is stopped, where additional protection against water intrusion may be useful. Examples of such possible conditions could include a lot of weight being on the boat 10 above the marine engine assembly 100 causing it to sink into water much lower than it typically does, the boat 10 and marine engine assembly 100 being launched in the water at a steep angle and/or at higher than normal speed, and rough water conditions.

To provide additional protection against water intrusion into the combustion chamber 136 from the exhaust system 156, the marine engine assembly 100 is provided with the valve 204, which acts as a sealing valve 204. When the sealing valve 204 is open, gas can flow through the gas flow pathway. However, when the sealing valve 204 is closed, flow of gas through the sealing valve 204 is prevented, and the sealing valve 204 thus hermetically seals the portion of the gas flow pathway downstream of the sealing valve 204 from the portion of the gas flow pathway upstream of the sealing valve 204. As a result, when the sealing valve 204 is closed, should water rise into the exhaust system 156 rise above the idle relief passage inlet 238, the gas present between the sealing valve 204 and the water having entered the exhaust system 156 is trapped and has nowhere to go. As such, this volume of air acts like an air spring pushing against the water, thus resisting increases in water level in the exhaust system 156. In embodiments where no idle relief passage 236 is provided the entire volume of gas between the sealing valve 204 and the exhaust outlets 234 could act like an air spring resisting increases in water level in the exhaust system 156.

In the present embodiment, the sealing valve 204 is provided in the air intake valve unit 200 and also combines the function of a throttle valve. It is contemplated that in other embodiments, two separate valves could be provided, one throttle valve and one sealing valve, and that the sealing valve could be in any location along the gas flow pathway. It is contemplated that the sealing valve 204 could be provided in the gas flow pathway at positions upstream of the combustion chambers 132, or upstream of the engine 116. It is contemplated that the sealing valve 204 could be provided in the gas flow pathway at positions downstream the engine 116.

Turning now to FIGS. 10 to 13, the intake valve unit 200 will be described in more detail. The intake valve unit 200 has a valve unit body 260. The valve unit body 260 has an upstream end 262 and a downstream end 264. The sealing valve 204 includes a cap 266, a streamlined body 268, a spring 270, a seal 272, and a shaft 276 pivotally supporting a cam 278 in the valve unit body 260. The cap 266 is disposed in the valve unit body 260 between the shaft 276 and the downstream end 264. The cap 266 translates between an open position, shown in FIGS. 11 and 13, and a closed position, shown in FIG. 12, as will be described below to define the open and closed positions of the sealing/throttle valve respectively. The streamlined body 268 is fixedly mounted in the valve unit body 260 downstream of the cap 266. As can be seen, the spring 270 is mounted inside the streamlined body 268 and abuts an inner surface of the cap 266. The spring 270 biases the cap 266 toward the closed position. In the closed position, the cap 266 is spaced from the streamlined body 268 and abuts the seal 272 provided in the valve unit body 260, thereby preventing flow of gas through the sealing valve 204 for hermetically sealing the portion of the valve unit body 260 downstream of the cap 266 from the portion of the valve unit body 260 upstream of the cap 266. In the open position, air can flow through the sealing/throttle valve 204. More specifically, the cap 266 is pushed against the front end of the streamlined body 268, such that the cap 266 and the streamlined body 268 form a generally teardrop shaped body so as to limit the turbulence created by the presence of the cap 266 and the streamlined body 268 in the air flowing through the valve unit body 260.

The intake valve unit 200 also has an actuator 274 disposed outside of the valve unit body 260. In the present embodiment, the actuator 274 is an electric motor, but other types of actuators are contemplated. The actuator 274 is connected to the shaft 276 for pivoting the cam 278. The cam 278 abuts the upstream side of the cap 266. To move the sealing/throttle valve 204 its open position (FIG. 13), the cam 278 pushes the cap 266 toward the streamlined body 268, and as a result the sealing/throttle valve 204 opens. To move the sealing/throttle valve 204 to its closed position (FIG. 12), the cam 278 is moved to the position shown in FIG. 1 such that it no longer pushes against the cap 266 and the spring 270 pushes the cap 266 against the seal 272. As a result the sealing/throttle valve 204 is closed. By pivoting the cam 278, position of the cap 266 is controlled, which controls the amount of air flowing through the intake valve unit 200, and as such the valve 204 acts as a throttle valve. Also, since the cap 266 provides a hermetic seal when it is pushed against the seal 272, the valve 203 also acts as a sealing valve.

Turning now to FIGS. 14 to 19, an intake valve unit 300, which is an alternative embodiment of the intake valve unit 200, will be described. The intake valve unit 300 has a valve unit body 302. The valve unit body 302 has an upstream end 304 and a downstream end 306.

A throttle valve 308 is pivotally disposed in the valve unit body 302. A throttle valve actuator 310 disposed outside of the valve unit body 302. In the present embodiment, the throttle valve actuator 310 is an electric motor, but other types of actuators are contemplated. The throttle valve actuator 310 is connected to a shaft 312 pivotally supporting the throttle valve 308 in the valve unit body 302 for moving the throttle valve 308 between opened and closed positions.

A sealing valve 314 is disposed in the valve unit body 302 between the throttle valve 308 and the downstream end 306. In the present embodiment, the sealing valve 314 is a ball valve 314. The ball valve 314 has a ball valve body 316 defining a passage 318 therethrough. The ball valve body 316 is pivotally received in a seat 319 define by the valve unit body 302. The ball valve body 316 is operatively connected to a sealing valve actuator 320 disposed outside of the valve unit body 302. In the present embodiment, the sealing valve actuator 320 is an electric motor, but other types of actuators are contemplated. The sealing valve actuator 320 pivots the ball valve body 316 between open and closed positions corresponding to open and closed positions of the ball valve 314.

Figure 16:
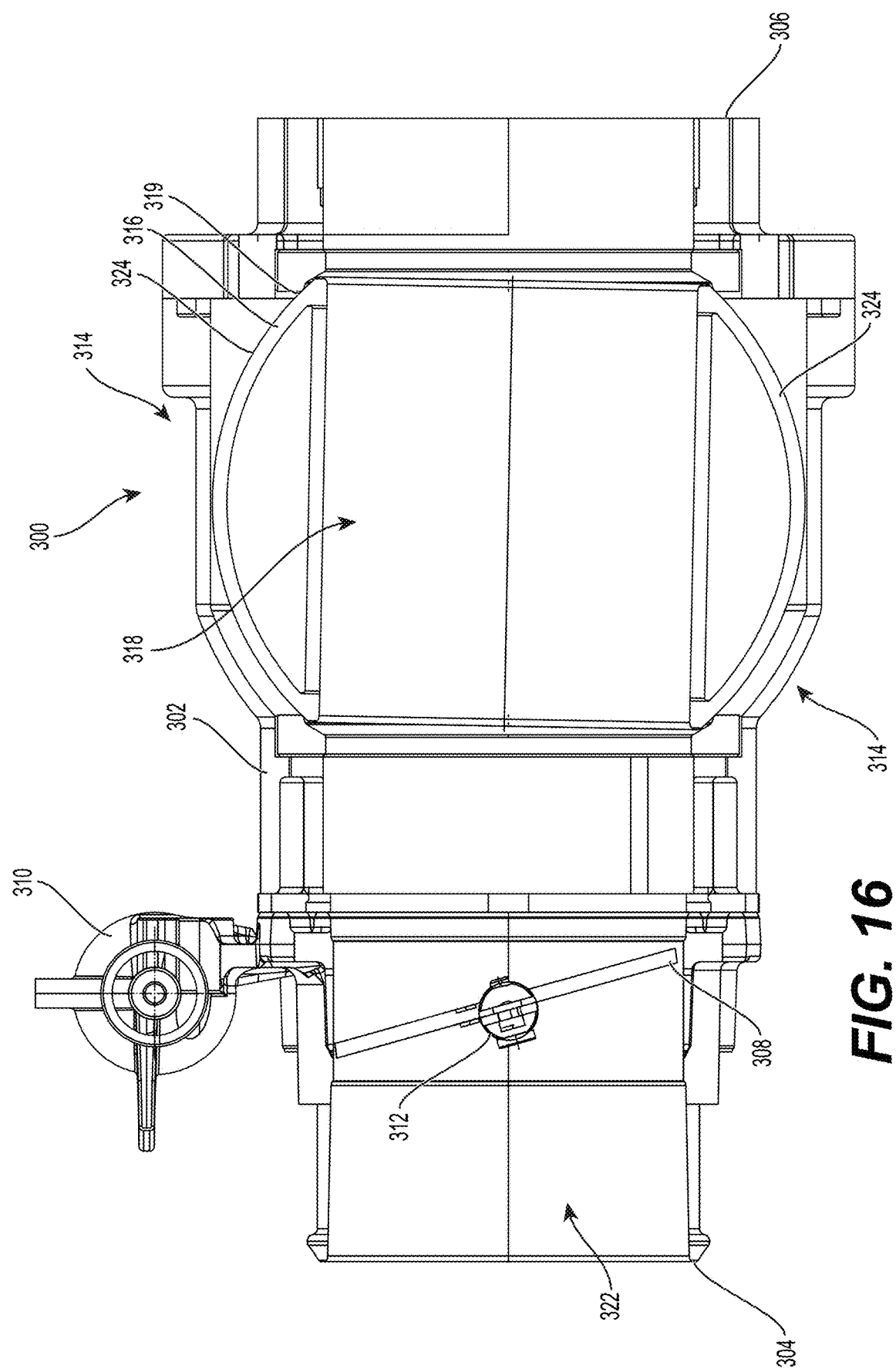
FIG. 16 is a cross-sectional view of the air intake valve unit of FIG. 14, taken through line 16-16 of FIG. 15, with a throttle valve of the air intake valve unit being closed and a sealing valve of the air intake valve unit being open.
Figure 17:
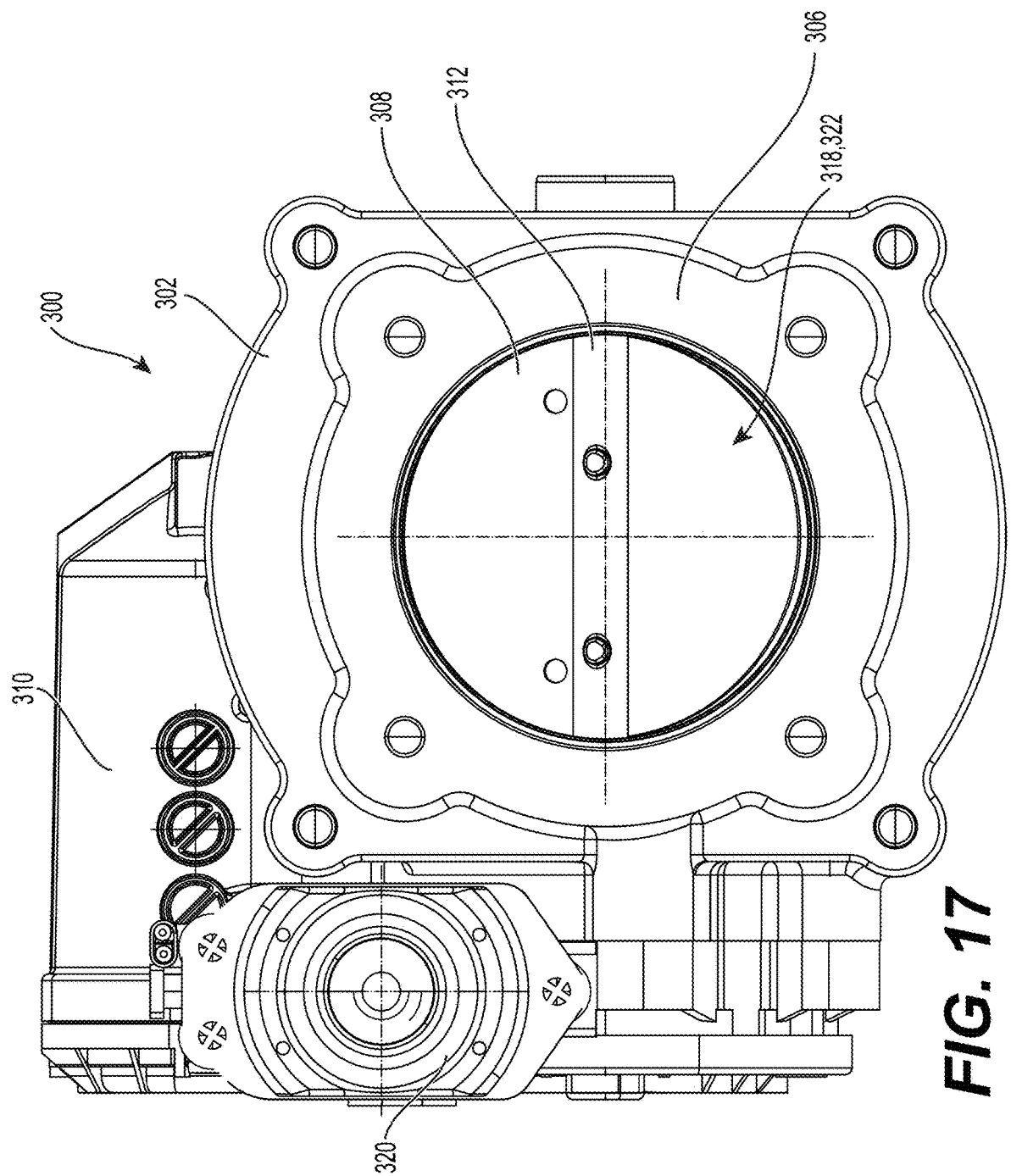
FIG. 17 is an outlet end view of the air intake valve unit of FIG. 14, with the throttle valve being closed and the sealing valve being open.
Figure 18:
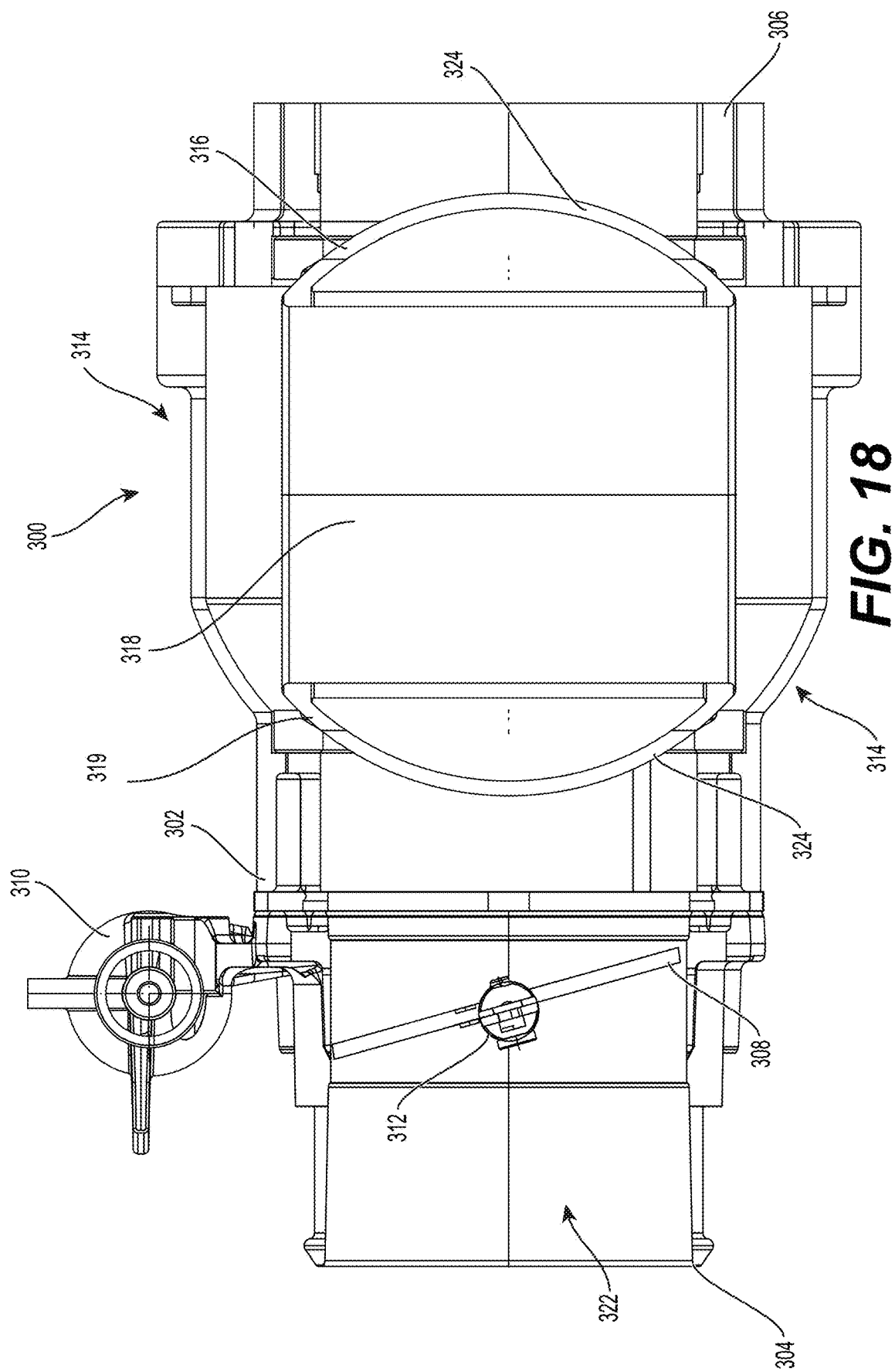
FIG. 18 is the cross-sectional view of FIG. 16, the throttle valve and the sealing valve both being closed.
Figure 19:
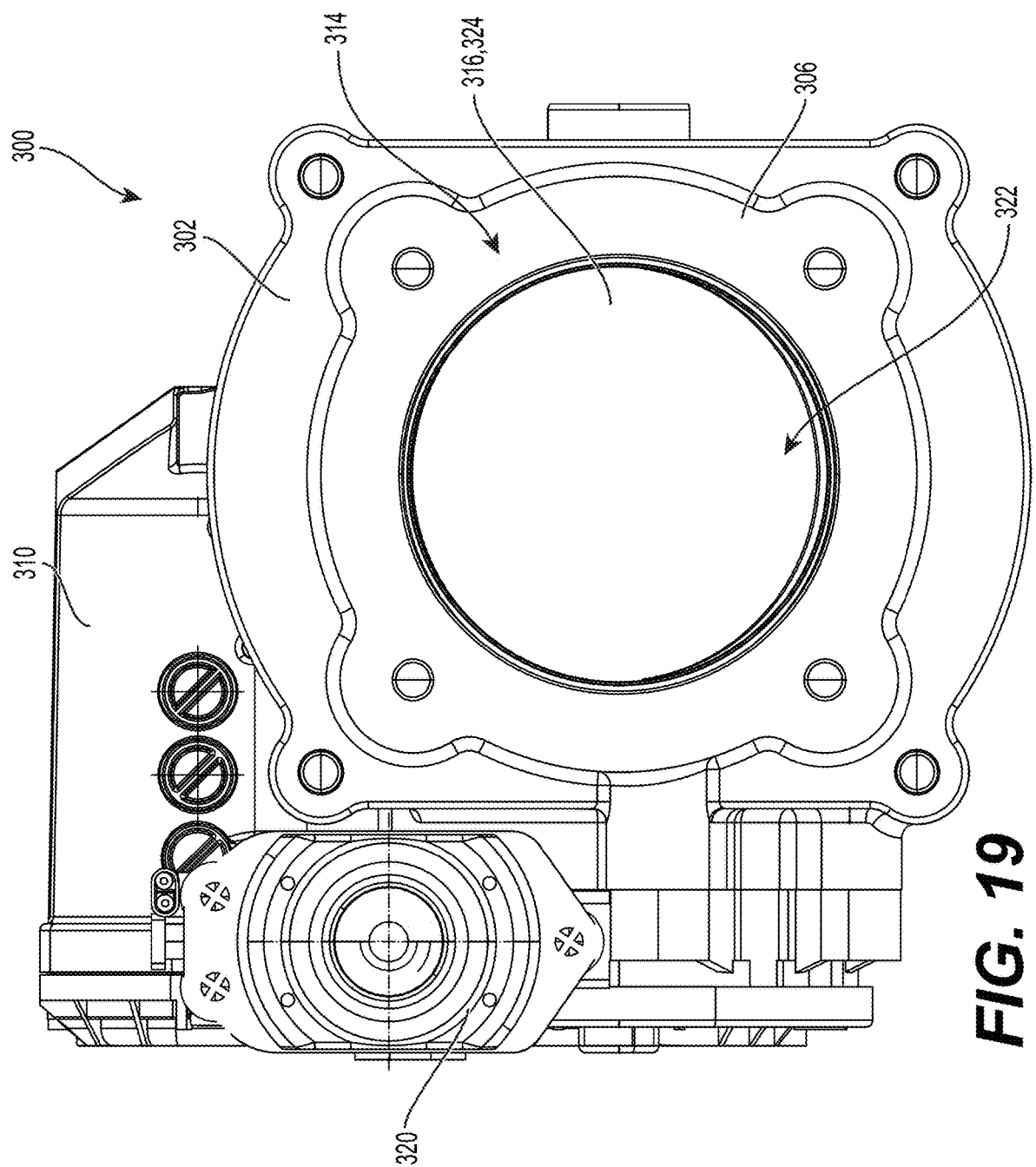
FIG. 19 is an outlet end view of the air intake valve unit of FIG. 14, with the throttle valve and the sealing valve both being closed.

In the open position of the ball valve 314, shown in FIGS. 16 and 17, the passage 318 of the ball valve body 316 is aligned with the passage 322 defined by the valve unit body 302, and gas can flow through the ball valve 314. In the closed position of the ball valve 314, shown in FIGS. 18 and 19, the ball valve body 316 is pivoted such that outer surfaces 324 of the ball valve body 316 block the passage 322, thereby preventing flow of gas through the ball valve 314 for hermetically sealing the portion of the valve unit body 302 downstream of the ball valve 314 from the portion of the valve unit body 302 upstream of the ball valve 314. It is contemplated that a sealing valve of a type other a ball valve could be used. For example, it is contemplated that a guillotine valve or a butterfly valve could be used as the sealing valve 314. As the intake valve unit 300 has different actuators 310 and 320 used for moving the throttle valve 308 and the sealing valve 314, the sealing valve 314 can be move independently of the throttle valve 308 and vice versa.

Figure 20:
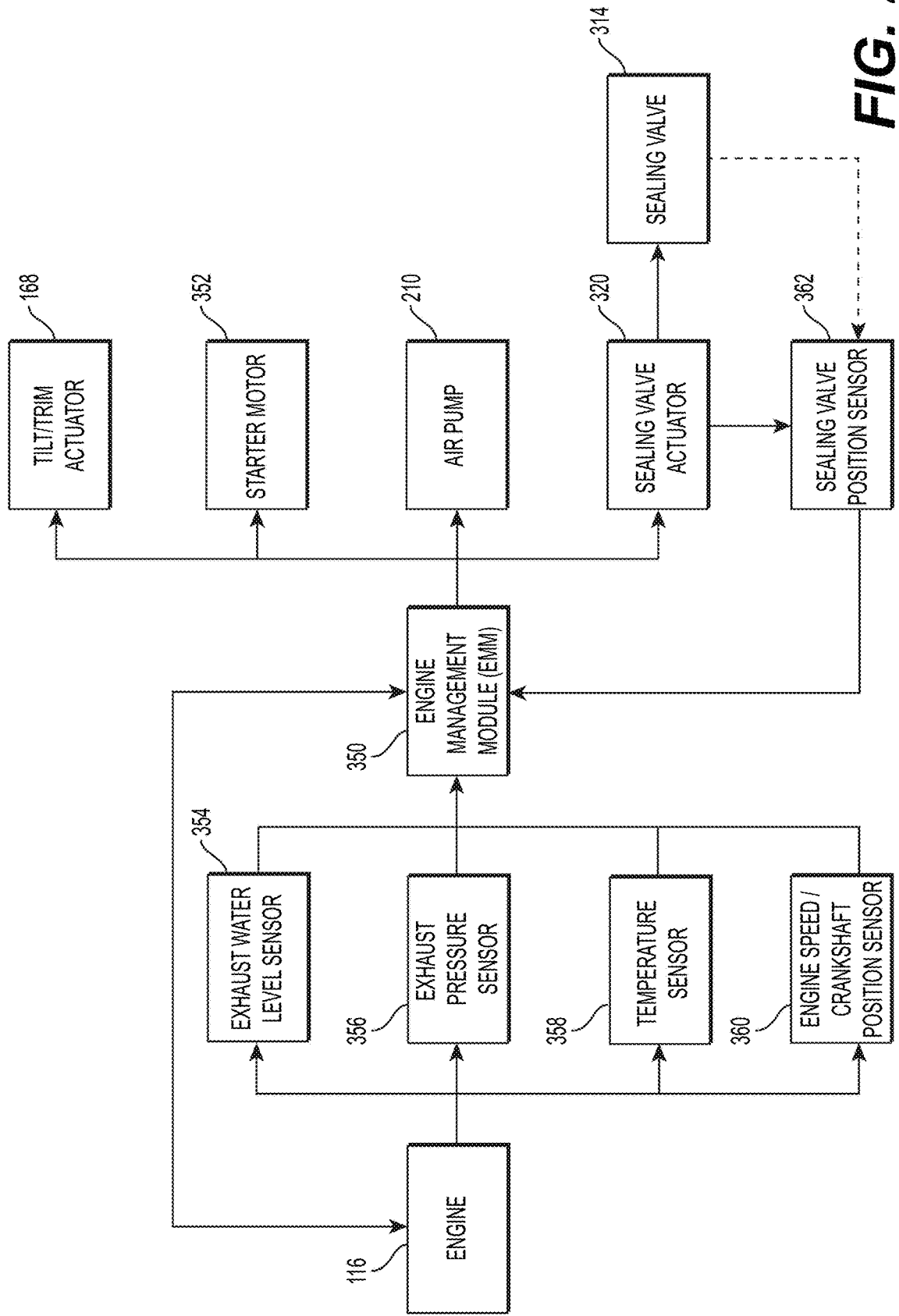
FIG. 20 is a schematic representation of some components of the marine engine assembly of FIG. 2 involved in an operation of the sealing valve of the air intake valve unit of FIG. 14 and in an operation of an air pump of the marine engine assembly of FIG. 2.

Turning now to FIG. 20, components of the marine engine assembly 100 (but provided with the intake valve unit 300 instead of the intake valve unit 200) involved in an operation of the sealing valve 314 of the air intake valve unit 300 and in an operation of the air pump 210 will be described.

An engine management module (EMM) 350 is provided inside the engine unit housing 110. The EMM 350 includes multiple processors and data storage modules. The EMM 350 is connected to and controls the operation of the engine 116, including the starter motor 352, the tilt/trim actuator 168, the air pump 210 and the sealing valve actuator 320. In order to control these components, the EMM 350 is connected to and receives signals from an exhaust water level sensor 354, an exhaust pressure sensor 356, a temperature sensor 358, an engine speed/crankshaft position sensor 360, a sealing valve position sensor 362 as well as other sensors provided on the engine 116, in the marine engine assembly 100, such as a throttle valve position sensor (not shown), and on the boat 10, such as a shift lever position sensor (not shown).

As can be seen in FIG. 8, the exhaust water level sensor 354 is located in the exhaust pipe 220, at a position downstream of the apex 222 and upstream of the idle relief passage inlet 238. When water makes contact with the exhaust water level sensor 354, the sensor 354 sends a signal to the EMM 350 indicating that water has reached this level in the exhaust system 156 and that some actions should be taken as will be described below. As can also be seen in FIG. 8, the exhaust pressure sensor 356 is also located in the exhaust pipe 220, at a position downstream of the apex 222 and upstream of the idle relief passage inlet 238. It is contemplated that the exhaust pressure sensor 356 could be at other locations in the exhaust system 156 upstream of the idle relief passage inlet 238, or that the exhaust pressure sensor 356 could be omitted. The exhaust pressure sensor 356 sends a signal indicative of gas pressure in the exhaust system 156. The temperature sensor 358 could be an exhaust temperature sensor sensing temperature in the exhaust system 156, an intake air temperature sensor sensing temperature in the air intake assembly 140, or a temperature sensor sensing temperature in the engine unit housing 110 around the engine 116. It is contemplated that one or more of these temperature sensors could be provided to send signals indicative of temperature to the EMM 350. For simplicity, the present will refer only to one temperature sensor 358, that could be any one or combinations of the aforementioned temperature sensors.

The engine speed/crankshaft position sensor 360 is located close to the crankshaft 130 or to an element that turns at the same speed as the crankshaft (such as a flywheel for example) to send signals to the EMM 350 that let the EMM 350 determine the orientation of the crankshaft 130, which allows the EMM 350 to know where each of the pistons 126 are positioned, and the speed of rotation of the crankshaft 130. When the engine 116 is first engaged by the starter 354 in order to start then engine 116, the EMM 350 is able to determine the position of the crankshaft 130 within the first or the first few rotations of the crankshaft 130 using the signals from the engine speed/crankshaft position sensor 360. This process of initially determining the position of the crankshaft 130 by the EMM 350 is sometimes referred to as synchronizing of the EMM 350 or "synch". If the EMM 350 is unable to synch, the starter motor 352 will be de-energized and the engine 116 will not be started.

The sealing valve position sensor 362, as its name suggest, sends a signal to the EMM 350 indicative of the position of the sealing valve 314. It is contemplated that the sealing valve position sensor 362 could be integrated with the sealing valve actuator 320 or could be a dedicated sensor sensing the position of sealing valve 314. It is also contemplated that the sealing valve position sensor 362 could only provide an indication of whether the sealing valve 314 is open or closed, without an exact indication of its position.

Figure 21:
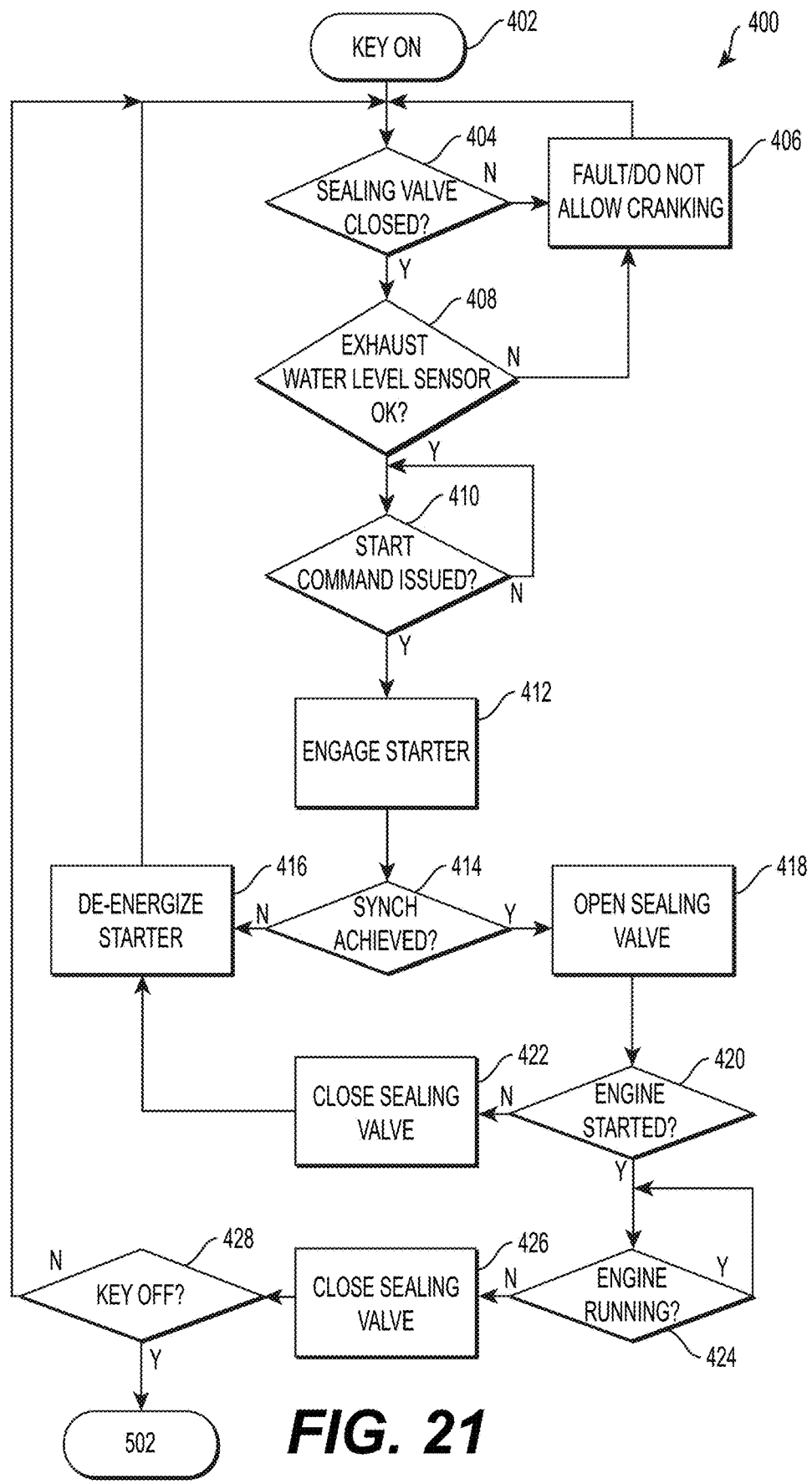
FIG. 21 is a flowchart illustrating the operation of the sealing valve of the air intake valve unit of FIG. 14.

Turning now to FIG. 21, a method 400 of operating the sealing valve 314 will be described. The method 400 begins at step 402 when the EMM 350 is awakened or turned on. In a boat 10 requiring a key to permit starting of the engine 116, this corresponds to when the key is inserted and at least partially turned, hence the name "key on" of step 402 in FIG. 21. It is contemplated that in boats 10 that does not require a key, this could correspond to the actuation of a button, a switch, a combination of buttons, or the detection of proximity of a remote fob or of the press of a button on the remote fob.

When the engine 116 stops running, the EMM 350 sends a signal to the sealing valve actuator 320 to close the sealing valve 314, as will be explain below with respect to step 426. Accordingly, from step 402, at step 404 the EMM 350 determines if the sealing valve 314 is closed (as it should be). If not, at step 406 the EMM 350 records a fault, does not allow cranking (i.e. starting) of the engine 116, and sends signals to provide an indication of this to the driver of the boat 10. The indication could be visual, such as a light turning on on a console, or auditory, such as one or more beeps.

If at step 404, the sealing valve 314 is closed, then at step 408 the EMM 350 determines if the exhaust water level sensor 354 is okay, meaning that it does not detect the presence of water. If water is detected, then the EMM 350 goes to step 406 described above. If the exhaust water level sensor 354 does not detect the presence of water, then at step 410 the EMM 350 checks if a start command has been issued. This could be the above mentioned key being turned to a start position, or a start button being pressed for example. The EMM 350 will hold at step 410 until a start command is issued.

Once a start command is issued, then at step 412 the EMM 350 sends a signal to the starter motor 352 to engage the engine 116 and start turning the crankshaft 130. Then at step 414, the EMM 350 determines if the above-mentioned synchronization (synch) of the EMM 350 has been achieved. If not, then the EMM 350 sends a signal to the starter 352 to de-energize at step 416 and then returns to step 404. If synchronization is achieved, at step 418 the EMM 350 sends a signal to the sealing valve actuator 320 to open the sealing valve 314. It is contemplated that in an alternative embodiment, the EMM 350 could send a signal to the sealing valve actuator 320 to at least partially open the sealing valve 314 slightly prior to or at the same time as performing step 412, then if synchronization is not achieved at step 414, the EMM 350 would send a signal to the sealing valve actuator 320 to close the sealing valve 314 before returning to step 404.

Once the sealing valve 314 is open, then at step 420 the EMM 350 determines if the engine 116 is running. This can be done by determining if the engine speed is higher than a predetermined speed for example, which would indicate that the engine 116 can turn the crankshaft 130 without the assistance of the starter 352. If the engine 116 is not running after a predetermined period of time, the EMM 350 sends a signal to the sealing valve actuator 320 to close the sealing valve 314 at step 422, then goes to step 416 where the starter 352 is de-energized as indicated above, and the returns to step 404.

If at step 420 it is determined that the engine 116 is started, the EMM 350 sends a signal to de-energize the starter motor 350 (not shown), and then the EMM 350 monitors if the engine 116 is running at step 424. The EMM 350 will hold at step 424 as long as the engine 116 is running. Once the engine 116 stops running, then at step 426 the EMM 350 sends a signal to the sealing valve actuator 320 to close the sealing valve 314, thus helping to prevent the intrusion of water into the combustion chambers 132 via the exhaust system 156 while the engine 116 is stopped, as described above. Then at step 428, the EMM 350 determines if the key has been removed (hence the name "key off") or an equivalent action that results in the EMM 350 being put to sleep, such as pressing an off button for example. If not, then the EMM 350 returns to step 404. If so, then the EMM 350 moves to step 502 of method 500 described below.

It is contemplated that a time delay could be applied before closing the sealing valve 314 at step 426. The reason for doing so would be to take into account thermal contraction of the gas into the gas flow pathway. When the engine 116 stops, the air in the gas flow pathway is hot. As it cools, the air contract which could reduce the volume of air trapped by the sealing valve 314 if the sealing valve 314 is closed right away. As such waiting for the gas in the gas flow path to cool before closing the sealing valve 314 could help prevent the reduction of gas volume due to thermal contraction. The time could be a set amount of time or an amount of time based on the temperature sensed by the temperature sensor 358. It is also contemplated that when the engine 116 stops running and the sealing valve 314 is closed, the EMM 350 could send a signal to the tilt/trim actuator 168 to trim the marine engine assembly 100 up, thus lifting the marine engine assembly 100 partially out of water.

If at any time during the method 400 the engine 116 stops running and/or a "key off" event (see step 428 above) occurs, the EMM 350 sends a signal to the sealing valve actuator 320 to close the sealing valve 314.

Figure 22:
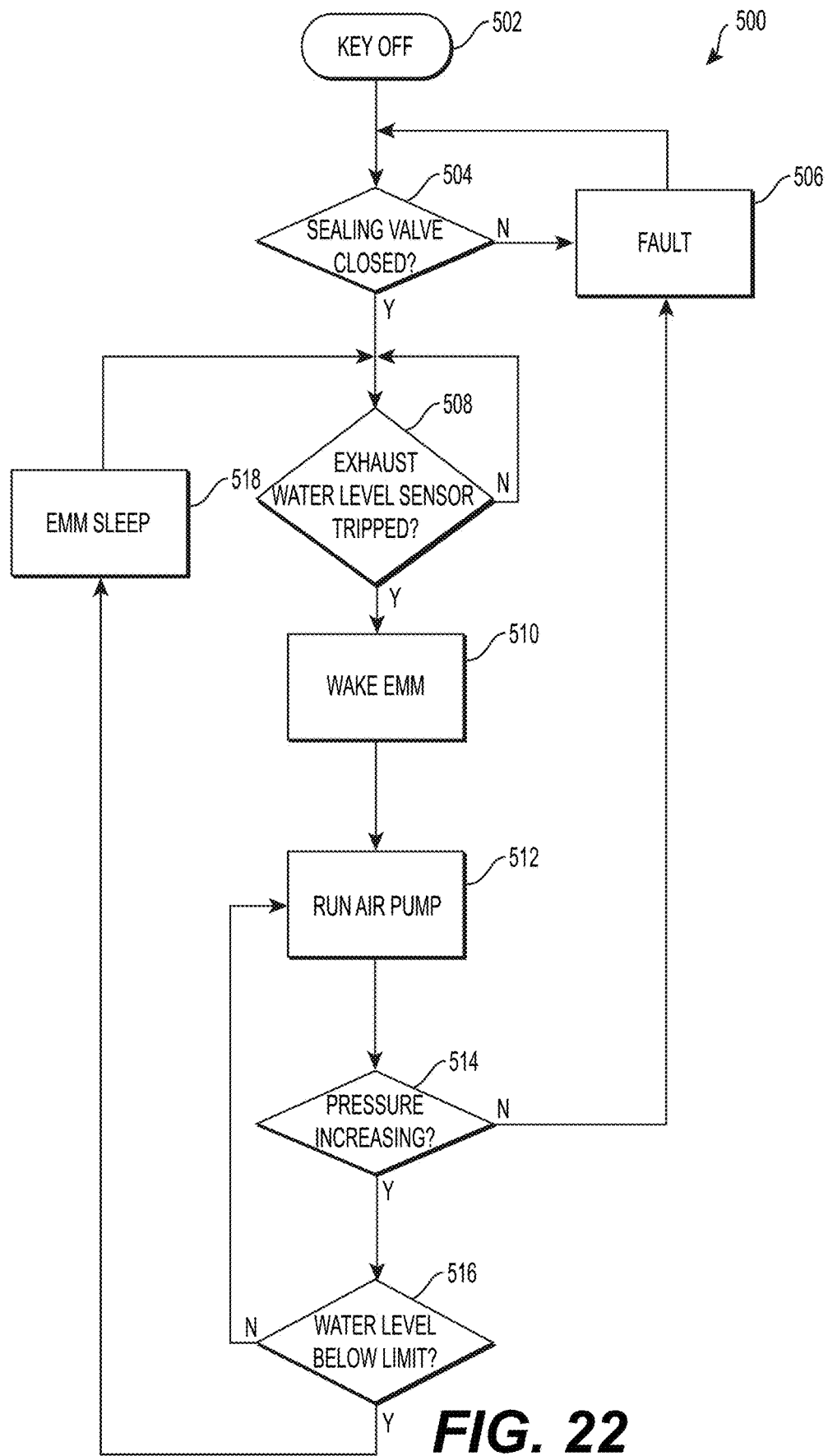
FIG. 22 is a flowchart illustrating the operation of the air pump of FIG. 20.

Turning now to FIG. 22, a method 500 for preventing intrusion of water into the combustion chambers 132 of the engine 116 from the exhaust system 156 will be described. The method begins at step 502 following a "key off" condition (step 428) occurring. Then at step 504, the EMM 350 determines if the sealing valve 314 is closed as it is supposed to be. If not, then at step 506 the EMM 350 records a fault and returns to step 504. It is contemplated that the EMM 350 could then send another signal to reattempt to close the sealing valve 314. If at step 504 the sealing valve 314 is closed, the EMM 350 goes to sleep.

Even though the EMM 350 is in a sleep mode, the exhaust water level sensor 354 is still powered in order to monitor the level of water in the exhaust system 156 at step 508. If the exhaust water level sensor 354 is tripped (i.e. water reaches the level of the water level sensor 354), the water level sensor 354 sends a signal to wake the EMM 350 at step 510. Then at step 512, the EMM 350 sends a signal to run the air pump 210. When it runs, the pump 210 supplies air downstream of the closed sealing valve 314 in an attempt to push the water out of the exhaust system 156. More specifically, the air pump 210 supplies air upstream of the engine 116, in the air intake manifold 208 of the air intake assembly 140.

Once the signal to run the air pump 210 is sent at step 512, the EMM 350 determines if the pressure sensed by the exhaust pressure sensor 356 increases. If the pressure is not increasing, it could be an indication that the pump 210 has failed (i.e. is not running or not running properly) or that there is a leak in the gas flow path between the sealing valve 314 and the water level in the exhaust system 156, or that the sealing valve 314 is not sealing properly. As such, if at step 514 the pressure is not increasing, then the EMM 350 stops the air pump 210 (not shown), records a fault at step 506 and returns to step 504. If at step 514 the pressure increases, then the EMM 350 continues to step 516. It is contemplated that at step 514 the EMM 350 could determine that the pressure is increasing at or above a predetermined rate.

At step 516, the EMM 350 determines based on the signal from the exhaust water level sensor 354 if the water is now at a level below the sensor 354. If not, the EMM 350 returns to step 512 and the pump 210 continues to run. If the water level is below the water level sensor 354, then the EMM 350 stops operating the air pump 210 (not shown), goes back to sleep 518, and the exhaust water level sensor 354 resumes monitoring of the water level.

It is contemplated that in addition to running the air pump 210 at step 512, the EMM 350 could send a signal to the tilt/trim actuator 168 to trim the marine engine assembly 100 up, thus lifting the marine engine assembly 100 partially out of water. It is also contemplated that, if at step 514 the pressure is not increasing, the EMM 350 could send a signal to the tilt/trim actuator 168 to trim the marine engine assembly 100 up, thus lifting the marine engine assembly 100 partially out of water. It is also contemplated that steps 514 and 516 could be omitted and that instead the air pump 210 could be made to run for a predetermined amount of time. It is also contemplated that the air pump 210 could be made to run for a predetermined amount of time at predetermined time intervals even if the exhaust water level sensor 354 has not been tripped. Finally, it is contemplated that the above method could be adapted to use the air pump 210 to remove water from the exhaust system 156 in embodiments where the sealing valve 314 is not provided.

If at any time during the method 500 a "key on" event (see step 402 above) occurs, the EMM 350 stops method 500 and begins method 400 at step 302.

Modifications and improvements to the above-described embodiments of the present technology may become apparent to those skilled in the art. The foregoing description is intended to be exemplary rather than limiting.

What is claimed is:
1. A marine engine assembly for mounting to a watercraft, the marine engine assembly comprising:
   an engine unit including:
      an engine unit housing;
      an internal combustion engine disposed in the engine unit housing, the engine defining at least one combustion chamber; and
      an air intake assembly disposed in the engine unit housing, the air intake assembly defining an air inlet, the air intake assembly being fluidly connected to the at least one combustion chamber for supplying air to the at least one combustion chamber,
      the air intake assembly including a throttle valve;
   an exhaust system fluidly communicating with the at least one combustion chamber for supplying exhaust gases from the at least one combustion chamber to an exterior of the marine engine assembly, the exhaust system defines an exhaust outlet, the air intake assembly, the at least one combustion chamber, and the exhaust system together defining at least in part a gas flow pathway, the air inlet defining an upstream end of the gas flow pathway, the exhaust outlet defining a downstream end of the gas flow pathway;

a sealing valve provided in the gas flow pathway between the air inlet and the exhaust outlet, the sealing valve having an open position permitting flow of gas therethrough, the sealing valve having a closed position preventing flow of gas therethrough for hermetically sealing a portion of the gas flow pathway downstream of the sealing valve from a portion of the gas flow pathway upstream of the sealing valve; and a propulsion device operatively connected to the engine.

2. The marine engine assembly of claim 1, wherein the sealing valve is disposed upstream of the at least one combustion chamber.

3. The marine engine assembly of claim 2, wherein the sealing valve is disposed downstream of the throttle valve.

4. The marine engine assembly of claim 3, wherein:
the sealing valve and the throttle valve are both part of an air intake valve unit; and
the air intake valve unit further includes:
 a sealing valve actuator operatively connected to the sealing valve for moving the sealing valve between the open position and the closed position; and
 a throttle valve actuator operatively connected to the throttle valve for moving the throttle valve.

5. The marine engine assembly of claim 1, further comprising:
a sealing valve actuator operatively connected to the sealing valve for moving the sealing valve between the open position and the closed position; and
an engine management module (EMM) disposed in the engine unit housing and being in communication with the sealing valve actuator; and
wherein:
 the EMM controls the sealing valve actuator such that the sealing valve is in the open position when the engine is in operation; and
 the EMM controls the sealing valve actuator such that the sealing valve is in the closed position when the engine is stopped.

6. The marine engine assembly of claim 1, wherein the sealing valve is a ball valve.

7. The marine engine assembly of claim 1, wherein the air inlet is defined in the engine unit housing and fluidly communicates with air exterior to the engine unit housing, the air intake assembly being fluidly connected to the at least one combustion chamber for supplying air exterior of the engine unit housing to the at least one combustion chamber.

8. The marine engine assembly of claim 1, further comprising:
a lower unit connected to the engine unit, the lower unit including:
 a lower unit housing fastened to the engine unit housing;
 a transmission disposed in the lower unit housing, transmission being operatively connected to the engine; and
 the propulsion device being operatively connected to the transmission.

9. The marine engine assembly of claim 8, wherein:
the propulsion device is a propeller; and
the exhaust outlet is defined in the propeller.

10. The marine engine assembly of claim 1, wherein the engine unit housing is sealed such that water in which the engine unit housing is immersed is impeded from entering the engine unit housing.

11. The marine engine assembly of claim 1, further comprising a transom bracket connected to the engine unit housing.

12. The marine engine assembly of claim 11, wherein:
the transom bracket defines a tilt-trim axis; and
a center of mass of the engine is disposed below the tilt-trim axis at least when the marine engine assembly is in a trim range.

13. An air intake valve unit for controlling a supply of air to an internal combustion engine comprising:
a valve unit body having an upstream end and a downstream end;
a throttle valve disposed in the valve unit body; and
a sealing valve disposed in the valve unit body,
the sealing valve having an open position permitting flow of gas therethrough and permitting flow of gas from the upstream end of the valve unit body to the downstream end of the valve unit body,
the sealing valve having a closed position preventing flow of gas therethrough for hermetically sealing a portion of the valve unit body downstream of the sealing valve from a portion of the valve unit body upstream of the sealing valve, and
in the closed position, the sealing valve preventing flow of gas from the upstream end of the valve unit body to the downstream end of the valve unit body.

14. The air intake valve unit of claim 13, wherein the sealing valve is disposed between the throttle valve and the downstream end of the valve unit body.

15. The air intake valve unit of claim 13, further comprising:
a sealing valve actuator operatively connected to the sealing valve for moving the sealing valve between the open position and the closed position; and
a throttle valve actuator operatively connected to the throttle valve for moving the throttle valve.

16. A method for preventing intrusion of water into a combustion chamber of an internal combustion engine of a marine engine assembly from an exhaust system of the marine engine assembly, the method comprising:
determining, by an engine management module (EMM), that the engine has stopped; and
in response to determining that the engine has stopped, sending a signal from the EMM to a sealing valve actuator to close a sealing valve,
the sealing valve being disposed in a gas flow pathway of the marine engine assembly, the gas flow pathway being defined at least in part by an air intake assembly of the marine engine assembly, the combustion chamber, and the exhaust system,
an air inlet of the air intake assembly defining an upstream end of the gas flow pathway, an exhaust outlet of the exhaust system defining a downstream end of the gas flow pathway, and
when closed, the sealing valve preventing flow of gas therethrough by hermetically sealing a portion of the gas flow pathway downstream of the sealing valve from a portion of the gas flow pathway upstream of the sealing valve.

17. The method of claim 16, wherein the sealing valve is disposed upstream of the combustion chamber.

18. The method of claim 17, wherein the sealing valve is disposed downstream of the throttle valve.

19. The method of claim 17, further comprising:
   determining, by the EMM, that a crankshaft of the engine is turning; and
   in response to determining that the crankshaft is turning, sending another signal from the EMM to the sealing valve actuator to open the sealing valve.

20. The method of claim 19, further comprising engaging a starter of the engine; and
   wherein sending the other signal from the EMM to the sealing valve actuator to open the sealing valve comprises sending the other signal from the EMM to the sealing valve actuator to open the sealing valve after the starter is engaged.

21. The method of claim 20, wherein sending the other signal from the EMM to the sealing valve actuator to open the sealing valve comprises sending the other signal from the EMM to the sealing valve actuator to open the sealing valve after the starter is engaged and before the starter is subsequently disengaged.

\* \* \* \* \*